(12) United States Patent
Kimoto

(10) Patent No.: US 8,817,370 B2
(45) Date of Patent: Aug. 26, 2014

(54) MAGNETIC CIRCUIT FOR FARADAY ROTATOR AND METHOD OF MANUFACTURING MAGNETIC CIRCUIT FOR FARADAY ROTATOR

(75) Inventor: Akihiro Kimoto, Mishima-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 281 days.

(21) Appl. No.: 13/321,598

(22) PCT Filed: Dec. 27, 2010

(86) PCT No.: PCT/JP2010/073596
§ 371 (c)(1),
(2), (4) Date: Nov. 21, 2011

(87) PCT Pub. No.: WO2011/078381
PCT Pub. Date: Jun. 30, 2011

(65) Prior Publication Data
US 2012/0062992 A1    Mar. 15, 2012

(30) Foreign Application Priority Data
Dec. 25, 2009   (JP) ................................. 2009-294914

(51) Int. Cl.
*G02F 1/09* (2006.01)

(52) U.S. Cl.
CPC ..................... *G02F 1/09* (2013.01)
USPC ..................... 359/484.1; 359/280

(58) Field of Classification Search
CPC ............................... H01F 10/24; H01F 10/193
See application file for complete search history.

(56) References Cited

U.S. PATENT DOCUMENTS

| 5,528,415 | A | * | 6/1996 | Gauthier et al. ............... 359/282 |
| 7,206,116 | B2 | | 4/2007 | Fehn et al. |
| 2008/0241513 | A1 | | 10/2008 | Komuro et al. |
| 2009/0237771 | A1 | | 9/2009 | Nakamura et al. |

FOREIGN PATENT DOCUMENTS

| JP | 2-176622 A | 7/1990 |
| JP | 2004-302412 A | 10/2004 |
| JP | 2008-270699 A | 11/2008 |
| JP | 2009-229802 A | 10/2009 |

OTHER PUBLICATIONS

International Search Report of PCT/JP2010/073596, mailing date Feb. 1, 2011.

* cited by examiner

*Primary Examiner* — Derek S Chapel
(74) *Attorney, Agent, or Firm* — Westerman, Hattori, Daniels & Adrian, LLP

(57) ABSTRACT

A magnetic circuit for a Faraday rotator capable of suppressing generation of irreversible demagnetization is provided. This magnetic circuit (100, 200, 300, 400, 500, 600, 700, 800, 900) for a Faraday rotator includes a first magnet (2, 202, 302, 702, 802), a second magnet (3, 203, 303, 703, 803) and a third magnet (4, 304, 604, 704, 804, 904), and a first high coercive force region (4b, 304b, 604b, 704b, 904b) is provided in the vicinity of at least the inner peripheral surface of a third through-hole (4a, 304a, 604a, 704a, 804a, 904a) of the third magnet.

19 Claims, 10 Drawing Sheets

MAGNETIC CIRCUIT FOR FARADAY ROTATOR AND METHOD OF MANUFACTURING MAGNETIC CIRCUIT FOR FARADAY ROTATOR

TECHNICAL FIELD

The present invention relates to a magnetic circuit for a Faraday rotator employed for a high-output laser such as a fiber laser and a method of manufacturing a magnetic circuit for a Faraday rotator.

BACKGROUND ART

A Faraday rotator is a device formed by a magnetic circuit for a Faraday rotator and a Faraday element, passing light only in one direction by a Faraday effect and blocking the same in the opposite direction. The Faraday rotator is so formed that the plane of polarization of a laser beam reaches a prescribed rotation angle when the laser beam is emitted from the Faraday element, if a magnetic field is applied to the Faraday element with the magnetic circuit for a Faraday rotator.

The Faraday rotator is applied to various uses, and a Faraday element of rare iron garnet such as yttrium iron garnet (YIG) is used as a Faraday element in a Faraday rotator for communication. A ferrite magnet is used for a magnetic circuit for a Faraday rotator creating a magnetic field applied to the Faraday element.

In a case of employing a Faraday element of rare earth iron garnet such as yttrium iron garnet (YIG) for a Faraday rotator for a high-output laser used for working or marking, on the other hand, a crystal of the Faraday element so absorbs light that the temperature rises. As a result, there has been such a problem that the laser beam goes out of focus to exert an influence on light blocking properties of the Faraday element. Therefore, a crystal of terbium gallium garnet (TGG) having small temperature dependence (hardly causing out-focusing resulting from temperature rise) is employed for a Faraday rotator for a high-output laser as a Faraday element.

However, this TGG has a small Faraday rotation factor (Verdet constant) as compared with rare earth iron garnet such as yttrium iron garnet (YIG). In order to obtain a prescribed rotation angle, therefore, it has been necessary to improve the strength of the magnetic field applied to the Faraday element or to lengthen the Faraday element. In the case of lengthening the Faraday element, there has been such an inconvenience that the magnetic circuit for a Faraday rotator in which the Faraday element is arranged also lengthens and the size of the Faraday rotator increases. Further, there has also been such an inconvenience that light is distorted in the crystal if the crystal of TGG itself serving as the Faraday element is formed long and hence high-priced optical glass for correction is also required. Therefore, a magnetic circuit for a Faraday rotator for preventing the Faraday rotator from increase in size is known in general. Such a magnetic circuit for a Faraday rotator is disclosed in Japanese Patent Laying-Open No. 2009-229802, for example.

In Japanese Patent Laving-Open No. 2009-229802, there is disclosed a miniature Faraday rotator including a magnetic circuit constituted of a first magnet magnetized in a direction perpendicular to an optical axis and directed toward the optical axis, a second magnet magnetized in a direction perpendicular to the optical axis and separating from the optical axis and a third magnet, arranged therebetween, magnetized in a direction parallel to the optical axis and directed from the second magnet toward the first magnet and a Faraday element. The magnetic circuit of this miniature Faraday rotator according to Japanese Patent Laying-Open No. 2009-229802 is provided with a hole portion in which the Faraday element is arranged. The miniature Faraday rotator is so formed that the direction of a magnetic field constituted of the first magnet and the second magnet in the hole portion is a direction parallel to the optical axis and directed from the first magnet toward the second magnet. In other words, the miniature Faraday rotator is so formed that the direction of the magnetic field constituted of the first magnet and the second magnet in the hole portion is a direction opposite to the direction of magnetization of the third magnet. Further, the miniature Faraday rotator is so formed that the relation of $L2/10 \approx L3 \leq L2$ holds assuming that $L2$ represents the length of the first magnet and the second magnet in the optical axis direction and $L3$ represents the length of the third magnet in the optical axis direction.

PRIOR ART

Patent Document

Patent Document 1: Japanese Patent Laying-Open No. 2009-229802

SUMMARY OF THE INVENTION

Problems to be Solved by the Invention

In the Faraday rotator described in Japanese Patent Laying-Open No. 2009-229802, however, the direction of magnetization of the third magnet in the hole portion and the direction of the magnetic field constituted of the first magnet and the second magnet are opposite to each other in the case of employing the magnetic circuit for a Faraday rotator having high magnetic field strength in order to apply the Faraday rotator to a high-output laser, and hence a magnet operating point of the third magnet lowers due to a diamagnetic field. Therefore, there is such a problem that the third magnet is easily irreversibly demagnetized. In the case where the Faraday rotator is applied to a high-output laser, the temperature easily rises also when the Faraday element is made of TGG, and hence there is also such a problem that the third magnet is further easily irreversibly demagnetized due to thermal energy resulting from temperature rise of at least 70° C.

The present invention has been proposed in order to solve the aforementioned problems, and an object of the present invention is to provide a magnetic circuit for a Faraday rotator and a method of manufacturing a magnetic circuit for a Faraday rotator each capable of suppressing generation of irreversible demagnetization.

Means for Solving the Problems and Effects of the Invention

A magnetic circuit for a Faraday rotator according to a first aspect of the present invention is a magnetic circuit for a Faraday rotator in which a Faraday element of a Faraday rotator is arranged, and includes a first magnet, including a first through-hole extending in an axial direction, magnetized in a direction perpendicular to the axial direction and separating from the first through-hole, a second magnet, including a second through-hole extending in the axial direction, magnetized in a direction perpendicular to the axial direction and directed toward the second through-hole and a third magnet arranged between the first magnet and the second magnet in the axial direction and magnetized in a direction parallel to the axial direction and directed from the first magnet toward the second magnet, while the third magnet includes a third through-hole, extending in the axial direction to connect the first through-hole and the second through-hole with each other, in which the Faraday element is arranged, and a first high coercive force region is provided in the vicinity of at least an inner peripheral surface of the third through-hole of the third magnet.

In the magnetic circuit for a Faraday rotator according to the first aspect of the present invention, as hereinabove described, the first high coercive force region is so provided in the vicinity of at least the inner peripheral surface of the third through-hole of the third magnet that the high coercive force region having higher coercive force than the remaining portions of the third magnet can be provided in the vicinity of the inner peripheral surface of the third through-hole of the third magnet easily causing irreversible demagnetization due to a reverse magnetic field resulting from a magnetic field constituted of the first magnet and the second magnet, whereby irreversible demagnetization in the first high coercive force region can be suppressed. Thus, the whole of the third magnet can be inhibited from being irreversibly demagnetized by the first high coercive force region provided in the vicinity of the inner peripheral surface. Further, the first high coercive force region has high coercive force, whereby irreversible demagnetization resulting from temperature rise can also be suppressed.

Preferably in the aforementioned magnetic circuit for a Faraday rotator according to the first aspect, the first high coercive force region provided on the third magnet is provided on at least a central portion of the third magnet along the axial direction in the inner peripheral surface of the third through-hole of the third magnet. According to this structure, the first high coercive force region having higher coercive force than the remaining portions can be provided on the central portion of the third magnet along the axial direction in the inner peripheral surface of the third through-hole of the third magnet more easily causing irreversible demagnetization resulting from a reverse magnetic field, whereby irreversible demagnetization in the third magnet can be effectively suppressed.

Preferably in the aforementioned magnetic circuit for a Faraday rotator according to the first aspect, the first high coercive force region is provided on a portion of the third magnet located in the vicinity of in a magnetic field constituted of the first magnet and the second magnet, the magnetic field in the axial direction substantially orthogonal to the direction of magnetization of the first magnet and the direction of magnetization of the second magnet and a direction directed from the second magnet toward the first magnet. According to this structure, the first high coercive force region having higher coercive force than the remaining portions can be provided on the portion of the third magnet easily causing irreversible demagnetization resulting from a reverse magnetic field, whereby irreversible demagnetization in the third magnet can be suppressed.

Preferably in the aforementioned magnetic circuit for a Faraday rotator according to the first aspect, the third magnet is formed by an R-T-B-based magnet mainly containing a rare earth element R (mainly composed of Nd and Pr, and containing Nd by at least 50%), a transition element mainly composed of Fe, and B (boron), and the first high coercive force region is formed by a heavy rare earth element concentrating in the vicinity of the inner peripheral surface of the third through-hole of the third magnet. In the vicinity of the said inner peripheral surface, Nd or Pr which is a light rare earth element in the main phase of an R-T-B-based sintered magnet is only partially substituted by Dy or Tb which is a heavy rare earth element so that the heavy rare earth element concentrates, whereby the coercive force of the first high coercive force region can be improved while suppressing reduction of residual magnetic flux density. Consequently, the coercive force of the third magnet including the first high coercive force region can be improved while maintaining magnetic field strength of the magnetic circuit for a Faraday rotator.

Preferably in this case, the first high coercive force region is mainly composed of a main phase of a tetragonal $R_2Fe_{14}B$-type compound, and formed by the heavy rare earth element, consisting of at least either one of Dy and Tb, being externally diffused into an outer periphery of the main phase and concentrating thereon. Thus, the third magnet including the first high coercive force region improved in coercive force can be easily formed by concentrating the heavy rare earth element consisting of at least either one of Dy and Tb in the vicinity of the inner peripheral surface of the third through-hole of the third magnet, without substantially causing reduction of the residual magnetic flux density.

Preferably in the aforementioned magnetic circuit for a Faraday rotator according to the first aspect, the first high coercive force region is circumferentially provided to surround the third through-hole in which the Faraday element is arranged. According to this structure, the first high coercive force region can be provided to surround the Faraday element, whereby influence of a reverse magnetic field can be further inhibited from being exerted on the third magnet. Consequently, irreversible demagnetization in the third magnet can be further suppressed.

Preferably in the aforementioned magnetic circuit for a Faraday rotator in which the first high coercive force region is provided on the central portion of the third magnet, the first high coercive force region is provided over the whole region of the inner peripheral surface of the third through-hole in the axial direction. According to this structure, irreversible demagnetization in the third magnet can be further suppressed.

Preferably in the aforementioned magnetic circuit for a Faraday rotator according to the first aspect, the first high coercive force region is formed in the range of at least 3 mm from the inner peripheral surface of the third through-hole in a direction orthogonal to the axial direction and separating from the third through-hole. According to this structure, irreversible demagnetization in the third magnet can be further suppressed.

Preferably in the aforementioned magnetic circuit for a Faraday rotator according to the first aspect, the coercive force of a portion of the third magnet other than the first high coercive force region is not less than the coercive force of the first magnet and the second magnet. According to this structure, not only the first high coercive force region of the third magnet but also the portion of the third magnet other than the first high coercive force region has high coercive force, whereby the whole of the third magnet can be more effectively inhibited from irreversible demagnetization originating from the first high coercive force region.

Preferably in the aforementioned magnetic circuit for a Faraday rotator according to the first aspect, the coercive force of a portion of the third magnet other than the first high coercive force region is at least 2350 kA/m, and smaller than the coercive force of the first high coercive force region. According to this structure, the third magnet can be inhibited from irreversible demagnetization not only by the first high coercive force region but also by the portion of the third magnet, other than the first high coercive force region, having the high coercive force of at least 2350 kA/m. More preferably, the third magnet has residual magnetic flux density of at least 1.0 T. According to this structure, sufficient magnetic field strength can be generated, whereby a desired rotation angle can be obtained also in a miniature Faraday rotator employing a crystal of terbium gallium garnet (TGG) as a Faraday element.

Preferably in the aforementioned magnetic circuit for a Faraday rotator in which the first high coercive force region is provided on the central portion of the third magnet, the first high coercive force region is so formed that a distribution range from the inner peripheral surface in a direction separating from the third through-hole enlarges from the sides of both end portions of the third magnet along the axial direction toward the side of the central portion. According to this structure, the first high coercive force region can be distributed in a wider range on the central portion more easily causing irreversible demagnetization resulting from a reverse magnetic field, whereby irreversible demagnetization on the central portion of the third magnet can be effectively suppressed due to smaller diffusion of the heavy rare earth element of at least either one of Dy and Tb. The point that the distribution range easily causing irreversible demagnetization due to a reverse magnetic field enlarges from the sides of both end portions of the third magnet toward the side of the central portion has already been confirmed in a simulation described later.

Preferably in the aforementioned magnetic circuit for a Faraday rotator according to the first aspect, a plurality of first magnet pieces formed by parting the third magnet on a plane orthogonal to the axial direction and each provided with a second high coercive force region are so combined in the axial direction that the first high coercive region consisting of a plurality of second high coercive force regions is constituted, and the first high coercive force region consisting of the plurality of second high coercive force regions is provided in the vicinity of at least the inner peripheral surface of the third through-hole. According to this structure, the inner peripheral surface of the through-hole can be divided into the plurality of first magnet pieces, whereby the second high coercive force regions can be reliably provided on surfaces of the individual first magnet pieces corresponding to the inner peripheral surface of the divided through-hole, as compared with a case of providing the first high coercive force region on the inner peripheral surface of the through-hole in the state provided with the through-hole. Thus, the first high coercive force region of the third magnet can be more reliably formed by combining the plurality of first magnet pieces provided with the second high coercive force regions.

Preferably in the aforementioned magnetic circuit for a Faraday rotator according to the first aspect, the first magnet and the second magnet are arranged to alternately line up along the axial direction while holding the third magnet therebetween. According to this structure, a plurality of units of magnetic circuits for Faraday rotators can be formed by arranging first magnets and second magnets to alternately line up along the axial direction while holding third magnets therebetween, even in such a case that a sufficient Faraday effect cannot be attained in a Faraday rotator having the magnetic circuit for a Faraday rotator including the first magnet, the second magnet and the third magnet as a unit. Thus, a Faraday rotator can be so formed that a sufficient Faraday effect is attained.

Preferably in the aforementioned magnetic circuit for a Faraday rotator according to the first aspect, the distances from first ends to second ends of the first magnet, the second magnet and the third magnet in a direction orthogonal to the axial direction correspond to a first distance, the distances from first ends to second ends of the first through-hole, the second through-hole and the third through-hole in the direction orthogonal to the axial direction correspond to a second distance, and the first distance is at least eight times and not more than 20 times the second distance. According to this structure, formation of high magnetic field strength can be inhibited from being difficult in the magnetic circuit for a Faraday rotator, by setting the first distance to at least eight times the second distance. Further, the first high coercive force region can be inhibited from easily causing irreversible demagnetization due to excessively high magnetic field strength in the magnetic circuit for a Faraday rotator, by setting the first distance to not more than 20 times the second distance.

A method of manufacturing a magnetic circuit for a Faraday rotator according to a second aspect of the present invention is a method of manufacturing a magnetic circuit for a Faraday rotator including a first magnet, including a first through-hole extending in an axial direction, magnetized in a direction perpendicular to the axial direction and separating from the first through-hole, a second magnet, including a second through-hole extending in the axial direction, magnetized in a direction perpendicular to the axial direction and directed toward the second through-hole and a third magnet, including a third through-hole, extending in the axial direction to connect the first through-hole and the second through-hole with each other, in which the Faraday element is arranged, magnetized in a direction parallel to the axial direction and directed from the first magnet toward the second magnet, including the steps of providing a first high coercive force region in the vicinity of at least an inner peripheral surface of the third through-hole by diffusing a heavy rare earth element from the inner peripheral surface of the third through-hole of the third magnet formed by an R-T-B-based magnet mainly containing a rare earth element R (mainly composed of Nd and Pr, and containing Nd by at least 50%), a transition element mainly composed of Fe, and B (boron), and connecting the first magnet, the second magnet and the third magnet with each other so that the first through-hole, the second through-hole and the third through-hole are connected with each other in the axial direction and the third magnet is arranged between the first magnet and the second magnet in the axial direction.

In the method of manufacturing a magnetic circuit for a Faraday rotator according to the second aspect of the present invention, as hereinabove described, the first high coercive force region is provided in the vicinity of at least the inner peripheral surface of the third through-hole, whereby irreversible demagnetization in the first high coercive force region can be suppressed. Thus, the whole of the third magnet in which the irreversibly demagnetized first high coercive force region is provided in the vicinity of the inner peripheral surface can be inhibited from being irreversibly demagnetized. Further, the first high coercive force region has high coercive force, whereby irreversible demagnetization resulting from temperature rise can also be suppressed. In addition, the heavy rare earth element is diffused from the inner peripheral surface of the third through-hole of the third magnet formed by the R-T-B-based magnet mainly containing the rare earth element R (mainly composed of Nd and Pr, and containing Nd by at least 50%), the transition element mainly composed of Fe and B (boron) so that Nd or Pr which is a light rare earth element in the main phase of an R-T-B-based sintered magnet can be partially substituted by Dy or Tb which is a heavy rare earth element by providing the first high coercive force region in the vicinity of at least the inner peripheral surface of the third through-hole, whereby the coercive force of the first high coercive force region can be improved while suppressing reduction of residual magnetic flux density. Consequently, the coercive force of the first high coercive force region can be improved while maintaining magnetic field strength of the magnetic circuit for a Faraday rotator.

Preferably in the aforementioned method of manufacturing a magnetic circuit for a Faraday rotator according to the second aspect, the step of providing the first high coercive force region includes a step of providing the first high coercive force on at least the central portion in the inner peripheral surface of the third through-hole by diffusing the heavy rare earth element from the inner peripheral surface of the third through-hole of the third magnet. According to this structure, the first high coercive force region having higher coercive force than the remaining portions can be provided on the central portion of the third magnet along the axial direction in the inner peripheral surface of the third through-hole of the third magnet more easily causing irreversible demagnetization resulting from a reverse magnetic field, whereby irreversible demagnetization in the third magnet can be effectively suppressed.

Preferably in the aforementioned method of manufacturing a magnetic circuit for a Faraday rotator according to the second aspect, the step of providing the first high coercive force region includes a step of circumferentially providing the first high coercive force region to surround the third through-hole in which the Faraday element is arranged. According to this structure, the first high coercive force region can be provided to surround the Faraday element, whereby influence of a reverse magnetic field can be further inhibited from being exerted on the third magnet. Consequently, irreversible demagnetization in the third magnet can be further suppressed.

Preferably in the aforementioned method of manufacturing a magnetic circuit for a Faraday rotator including the step of providing the first high coercive force region on the central portion, the step of providing the first high coercive force region on the central portion includes a step of providing the first high coercive force region over the whole region of the inner peripheral surface of the third through-hole in the axial direction by diffusing the heavy rare earth element substantially from the overall surface of the inner peripheral surface of the third through-hole. According to this structure, the first high coercive force region can be provided over the whole region of the inner peripheral surface of the third through-hole of the third magnet in the axial direction easily causing irreversible demagnetization resulting from a reverse magnetic field, whereby irreversible demagnetization in the third magnet can be further suppressed.

Preferably in the aforementioned method of manufacturing a magnetic circuit for a Faraday rotator including the step of providing the first high coercive force region on the central portion, the step of providing the first high coercive force region on the central portion includes a step of providing the first high coercive force region so that a distribution range from the inner peripheral surface in a direction separating from the third through-hole enlarges from the sides of both end portions of the third magnet along the axial direction toward the side of the central portion. According to this structure, the first high coercive force region can be distributed in a wider range on the central portion more easily causing irreversible demagnetization resulting from a reverse magnetic field, whereby irreversible demagnetization on the central portion of the third magnet can be effectively suppressed.

MODES FOR CARRYING OUT THE INVENTION

Embodiments of the present invention are now described with reference to the drawings.

First Embodiment

First, the structure of a Faraday rotator 100 according to a first embodiment of the present invention is described with reference to FIGS. 1 to 3.

Figure 1:
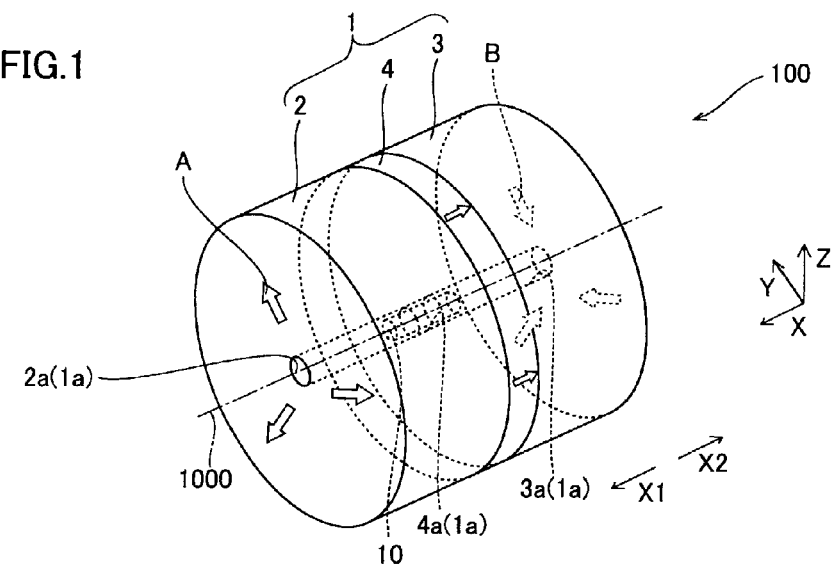
FIG. 1 A perspective view showing the structure of a Faraday rotator according to a first embodiment of the present invention.

The Faraday rotator 100 according to the first embodiment of the present invention includes a magnetic circuit 1 for a Faraday rotator having a cylindrical shape and a columnar Faraday element 10, as shown in FIG. 1. More specifically, the magnetic circuit 1 for a Faraday rotator is formed to extend in an X direction in a state where a section (X-Z plane) orthogonal to an axial direction (X direction) where a central axis 1000 extends has an annular shape, while maintaining this sectional shape. A through-hole 1a extending in the X direction from one end surface toward another end surface is formed at the center of the section (Y-Z plane) of the magnetic circuit 1 for a Faraday rotator. The Faraday element 10 is so formed that the same is arranged in the through-hole 1a of the magnetic circuit 1 for a Faraday rotator.

The Faraday element 10 has a function of, when the Faraday element 10 is arranged in a magnetic field formed by the magnetic circuit 1 for a Faraday rotator, emitting an incident laser beam in a state rotating the plane of polarization thereof at a prescribed rotation angle. At this time, the rotation angle is decided by a Faraday rotation factor (Verdet constant) specific to the material for the Faraday element 10, magnetic field strength necessary for causing a Faraday effect (rotation angle) and a diameter L2, described later, of the through-hole 1a.

Magnetic field strength necessary for attaining a desired Faraday effect (rotation angle) varies with the length of the Faraday element 10 arranged in the magnetic circuit 1 for a Faraday rotator. More specifically, the magnetic field strength necessary for attaining the desired Faraday effect (rotation angle) and the length of the Faraday element 10 is in inverse proportion to each other. In such a case that magnetic field strength necessary for attaining a desired Faraday effect in a Faraday element having a prescribed length is 2 T while magnetic field strength obtained in a magnetic circuit for a Faraday rotator is 1 T, for example, equivalent characteristics (desired Faraday effect) cannot be attained unless the Faraday element is set to a length twice the prescribed length. Therefore, the magnetic circuit for a Faraday rotator increases in size following the enlargement of the length of the Faraday element while the shape of a laser beam is distorted in a crystal of the Faraday element, and hence high-priced glass for correcting the distortion of the laser beam is also required. Therefore, a large-sized magnet necessary for increasing the size of the magnetic circuit for a Faraday rotator and the glass for correcting the distortion are required, leading to an excessive cost.

The Faraday element 10 is made of terbium gallium garnet (TGG) having small temperature dependence (hardly causing out-focusing resulting from temperature rise). This TGG has a small Faraday rotation factor as compared with rare earth iron garnet such as yttrium iron garnet (YIG).

Figure 2:
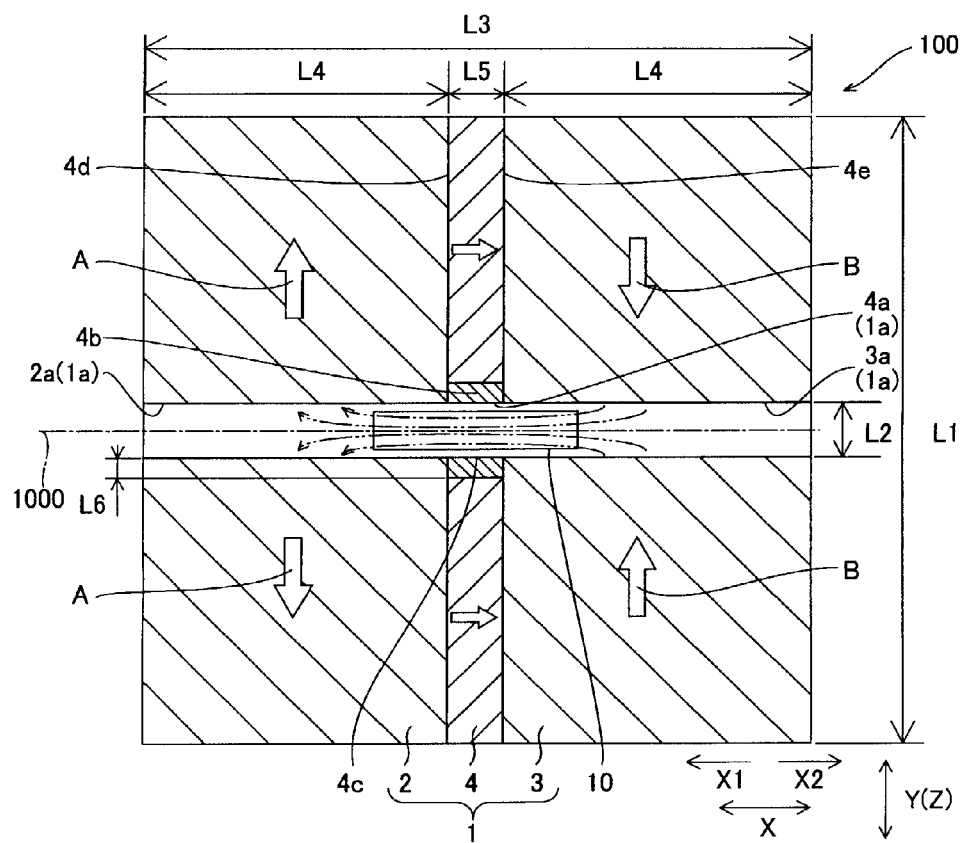
FIG. 2 A sectional view in a case of cutting the Faraday rotator according to the first embodiment of the present invention along a direction where a central axis extends.

FIG. 2 shows a section of the magnetic circuit 1 for a Faraday rotator. As a miniature Faraday rotator employing TGG, the outer diameter L1 in the section (Y-Z plane) of the magnetic circuit 1 for a Faraday rotator in FIG. 2 is preferably at least about 30 mm and not more than about 70 mm. The diameter L2 of the through-hole 1a of the magnetic circuit 1 for a Faraday rotator is preferably at least about 3 mm and not more than about 7 mm. The length L3 of the magnetic circuit 1 (through-hole 1a) for a Faraday rotator in the X direction is preferably at least about 20 mm and not more than about 60 mm.

The magnetic circuit 1 for a Faraday rotator is formed by a first magnet 2, a second magnet 3 and a third magnet 4 having cylindrical shapes, as shown in FIG. 1. The first magnet 2 is arranged on one side (X1 side) of the magnetic circuit 1 for a Faraday circuit, while the second magnet 3 is arranged on another side (X2 side) of the magnetic circuit 1 for a Faraday circuit. The first magnet 2 and the second magnet 3 have the same shapes. The third magnet 4 is held and arranged between the first magnet 2 and the second magnet 3 in the axial direction (X direction). The first magnet 2, the second magnet 3 and the third magnet 4 are arranged along the same central axis 1000 extending in the X direction.

The first magnet 2, the second magnet 3 and the third magnet 4 are formed to extend in the X direction together, in a state having annular sectional shapes in the Y-Z plane orthogonal to the axial direction (X direction) where the central axis 1000 extends. Through-holes 2a, 3a and 4a extending in the X direction are formed at the centers of sections (Y-Z plane) of the first magnet 2, the second magnet 3 and the third magnet 4 respectively. These through-holes 2a, 3a and 4a have circular sections (Y-Z plane). The through-holes 2a, 3a and 4a are examples of the "first through-hole", the "second through-hole" and the "third through-hole" in the present invention respectively.

The through-holes 2a, 3a and 4a are connected with each other, whereby the through-hole 1a is formed. The Faraday element 10 is arranged in the through-hole 1a in a state where a central portion in the X direction is substantially located on a central portion of the through-hole 4a of the third magnet 4 in the X direction.

As shown in FIG. 2, the outer diameters of the first magnet 2, the second magnet 3 and the third magnet 4 are identical to the outer diameter L1 of the magnetic circuit 1 for a Faraday rotator. The diameters of the first magnet 2, the second magnet 3 and the third magnet 4 are identical to the diameter L2 of the through-hole 1a. The first magnet 2, the second magnet 3 and the third magnet 4 are preferably so formed that the outer diameters L1 thereof are about 10 times the diameters L2 of the through-holes 2a, 3a and 4a. According to the present invention, a high coercive force region is formed from the through-hole 4a in the third magnet having high coercive force so that the third magnet is hardly irreversibly demagnetized also under a high temperature of at least 70° C. employed for a high-output laser, whereby the diameters of the through-holes 2a, 3a and 4a can be rendered identical to the diameter L2 of the through-hole 1a. The outer diameter L1 is an example of the "first distance" in the present invention, and the diameter L2 is an example of the "second distance" in the present invention.

According to the first embodiment, no irreversible demagnetization takes place even if there is influence of magnetic fields of the first magnet 2 and the second magnet 3 as apprehended in the aforementioned Patent Document 1 or the third magnet 4 is under a high-temperature condition of at least about 70° C. and not more than 80° C. Therefore, there is no need to reduce influence of the magnetic fields of the first magnet 2 and the second magnet 3 in the third magnet 4 by increasing the outer diameter of only the through-hole 4a, whereby the diameters of the through-holes 2a, 3a and 4a can be set to the same length (L2).

Both of the lengths L4 of the first magnet 2 (through-hole 2a) and the second magnet 3 (through-hole 3a) in the X direction are preferably at least about 8.5 mm and not more than about 25 mm. The length L5 of the third magnet 4 (through-hole 4a) in the X direction is preferably at least about 3 mm and not more than about 10 mm.

The first magnet 2 is magnetized in a direction (arrow A direction) perpendicular to the axial direction (X direction) and separating from the through-hole 2a. The second magnet 3 is magnetized in a direction (arrow B direction) perpendicular to the axial direction (X direction) and directed toward the through-hole 3a. In other words, the magnetic circuit 1 for a Faraday rotator is so formed that the direction (arrow B direction) of magnetization of the second magnet 3 is opposite to the direction (arrow A direction) of magnetization of the first magnet 2. Thus, the magnetic circuit 1 for a Faraday rotator is so formed that the direction of the magnetic field in the through-hole 4a is a direction (arrow X1 direction) directed from the second magnet 3 toward the first magnet 2 along the axial direction (X direction).

On the other hand, the third magnet 4 is magnetized in a direction (arrow X2 direction) parallel to the axial direction (X direction) and directed from the first magnet 2 toward the second magnet 3. In other words, the magnetic circuit 1 for a Faraday rotator is so formed that the direction (arrow X1 direction) of the magnetic field in the through-hole 4a and the direction (arrow X2 direction) of magnetization of the third magnet 4 are opposite to each other.

The first magnet 2, the second magnet 3 and the third magnet 4 are formed by R—Fe—B-based sintered magnets capable of generating strong magnetic fields of at least about 1.5 T and not more than about 3.0 T. An R—Fe—B-based sintered magnet mainly contains a rare earth element R (mainly composed of Nd and Pr, and containing Nd by at least 50%), a transition element mainly composed of Fe, and B (boron). Thus, it is possible to attain a desired Faraday effect (rotation angle) also when reducing the length of the Faraday element 10 in the X direction, by generating strong magnetic fields of at least about 1.5 T and not more than about 3.0 T with the first magnet 2, the second magnet 3 and the third magnet 4.

The third magnet 4 is formed by the same R—Fe—B-based sintered magnet as the R—Fe—B-based sintered magnets of the first magnet 2 and the second magnet 3, or an R—Fe—B-based sintered magnet having larger coercive force than the R—Fe—B-based sintered magnets of the first magnet 2 and the second magnet 3. The third magnet 4 has residual magnetic flux density of at least about 1.0 T and coercive force of at least 2350 kA/m. Thus, it becomes possible to generate a strong magnetic field of at least about 1.5 T and not more than about 3.0 T in the through-hole 1a of the magnetic circuit 1 for a Faraday rotator employing TGG for the Faraday element, whereby it is possible to reduce the length of the Faraday element 10 due to the large magnetic field strength.

Figure 3:
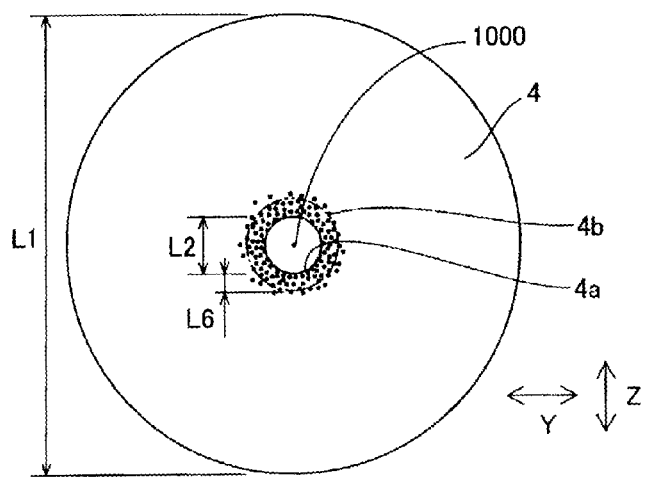
FIG. 3 A sectional view in a case of cutting a third magnet according to the first embodiment of the present invention perpendicularly to the direction where the central axis extends.

According to the first embodiment, a high coercive force region 4b is formed in the vicinity of the inner peripheral surface of the through-hole 4a of the third magnet 4, as shown in FIGS. 2 and 3. The high coercive force region 4b has coercive force (about 2800 kA/m) larger than coercive force (about 2350 kA/m) of portions of the third magnet 4 other than the high coercive force region 4b. Thus, reduction of a magnet operating point resulting from a reverse magnetic field can be suppressed under a temperature condition of at least 70° C. in the third magnet 4.

The high coercive force region 4b is layeredly and circumferentially formed to surround the inner peripheral surface over the whole region of the inner peripheral surface of the through-hole 4a of the third magnet 4. In other words, the high coercive force region 4b is uniformly formed not only on a central portion 4c but also from an end portion 4d on the X1 side up to an end portion 4e on the X2 side on the inner peripheral surface of the through-hole 4a of the third magnet 4. Further, the high coercive force region 4b is formed with a depth (thickness) L6 of at least about 3 mm from the inner peripheral surface of the through-hole 4a toward the inner part (arrow A direction) of the third magnet 4. The high coercive force region 4b is an example of the "first high coercive force region" in the present invention.

As shown in FIG. 3, the high coercive force region 4b is formed by a heavy rare earth element RH, consisting of at least either one of Dy and Tb, being diffused from the whole region of the inner peripheral surface of the through-hole 4a. Preferably, the high coercive force region 4b is mainly composed of a main phase formed by crystal grains of a tetragonal $R_2Fe_{14}B$-type compound, and formed by a light rare earth element RL (at least either one of Nd and Pr) in a rare earth element R, located on an outer periphery (in the vicinity of a grain boundary) of the main phase, being substituted by a heavy rare earth element RH consisting of at least either one of Dy and Tb. Thus, magnetocrystalline anisotropy in the outer periphery of the $R_2Fe_{14}B$ phase which is the main phase is increased, whereby the coercive force in the high coercive force region 4b is high. On the other hand, the heavy rare earth element RH does not diffuse into the $R_2Fe_{14}B$ phase itself (in the crystal grains) which is the main phase, and hence the light rare earth element RL remains in the crystal. Thus, reduction of the residual magnetic flux density in the high coercive force region 4b is suppressed.

A manufacturing process for the Faraday rotator 100 according to the first embodiment of the present invention is now described with reference to FIGS. 1 to 3.

First, a first magnet body, a second magnet body and a third magnet body having cylindrical shapes and provided with the through-holes 2a, 3a and 4a are prepared. R—Fe—B-based sintered magnets mainly containing a rare earth element R (mainly composed of Nd and Pr, and containing Nd by at least 50%), a transition element mainly composed of Fe, and B (boron) are employed for the first magnet body, the second magnet body and the third magnet body. Further, an R—Fe—B-based sintered magnet having coercive force of 2350 kA/m is employed for at least the third magnet. The first magnet body, the second magnet body and the third magnet body correspond to the first magnet 2, the second magnet 3 and the third magnet 4 not yet magnetized respectively.

According to the first embodiment, the high coercive force region 4b shown in FIG. 3 is formed in the vicinity of the inner peripheral surface of the through-hole 4a of the third magnet body, on the basis of evaporation diffusion (hereinafter referred to as RH diffusion) described in WO2007/102391. More specifically, a bulk body (not shown) containing a heavy rare earth element RH (at least one species selected from a group including at least Dy and Tb) is oppositely arranged in a treatment chamber (not shown) along with the third magnet body. Then, the bulk body and the third magnet body in the treatment chamber are heated to at least about 700° C. and not more than about 1000° C. for supplying the heavy rare earth element RH to the side of the inner peripheral surface of the through-hole 4a of the third magnet body, thereby diffusing the same into the inner part of the third magnet body. Heat treatment is further performed as necessary, to diffuse the heavy rare earth element RH further into the inner part of the third magnet body.

Thus, the light rare earth element RL in the rare earth element R of the $R_2Fe_{14}B$-type compound located on the outer periphery (in the vicinity of the grain boundary) of the main phase is substituted by the heavy rare earth element RH. Consequently, the high coercive force region 4b shown in FIG. 3 is layeredly and circumferentially formed to surround the inner peripheral surface over the whole region of the inner peripheral surface of the through-hole 4a of the third magnet body. The high coercive force region 4b is formed with the depth (thickness) L6 of at least about 3 mm from the inner peripheral surface of the through-hole 4a toward the inner part (arrow A direction) of the third magnet 4. A mask is so formed on a prescribed region of the third magnet body that it is possible to form the high coercive force region only on a portion other than the mask.

As a method of forming the high coercive force region 4b in the vicinity of the inner peripheral surface of the through-hole 4a of the third magnet body, a method other than the aforementioned evaporation diffusion may be employed. For example, the high coercive force region 4b may be formed in the vicinity of the inner peripheral surface of the through-hole 4a of the third magnet body by applying the heavy rare earth element RH in the vicinity of the inner peripheral surface of the through-hole 4a of the third magnet body and thereafter performing heat treatment.

Thereafter the first magnet 2 is formed by magnetizing the first magnet body in the direction (arrow A direction) perpendicular to the axial direction (X direction) and separating from the through-hole 2a. Further, the second magnet 3 is formed by magnetizing the second magnet body in the direction (arrow B direction) perpendicular to the axial direction (X direction) and directed toward the through-hole 3a. In addition, the third magnet 4 is formed by magnetizing the third magnet body in the direction (arrow X2 direction) parallel to the axial direction (X direction) and directed from the first magnet 2 (first magnet body) toward the second magnet 3 (second magnet body).

Then, the first magnet 2, the third magnet 4 and the second magnet 3 are arranged from the X1 side toward the X2 side, so that the through-holes 2a, 3a and 4a are connected with each other. Thereafter the first magnet 2, the third magnet 4 and the second magnet 3 are bonded to each other with a two-part mixed adhesive. Thus, the magnetic circuit 1 for a Faraday rotator is formed.

Finally, the Faraday element 10 made of TGG is arranged in the through-hole 1a of the magnetic circuit 1 for a Faraday rotator. At this time, the Faraday element 10 is so arranged that the central portion of the Faraday element 10 in the X direction is substantially located on the central portion of the through-hole 3a in the X direction. Thus, the Faraday rotator 100 is manufactured.

According to the first embodiment, as hereinabove described, the high coercive force region 4b is layeredly and circumferentially formed to surround the inner peripheral surface over the whole region of the inner peripheral surface of the through-hole 4a of the third magnet 4 which is the vicinity of the magnetic field in the direction (X1 direction) directed from the second magnet 3 toward the first magnet 2 along the axial direction (X direction), whereby irreversible demagnetization in the whole of the third magnet 4 due to a reverse magnetic field resulting from the magnetic field constituted of the first magnet 2 and the second magnet 3 can be suppressed. Further, the high coercive force region 4b has high coercive force, whereby irreversible demagnetization resulting from temperature rise can also be suppressed. Consequently, a sufficiently high magnetic field (at least about 1.5 T and not more than about 3.0 T) can be applied to the Faraday element 10, and irreversible demagnetization can also be suppressed even under a temperature condition of a certain degree of high temperature (at least 70° C. and not more than 80° C.). In other words, the magnetic circuit 1 for a Faraday rotator according to the first embodiment is particularly suitable in the case of employing TGG having a small Faraday rotational frequency rotation factor as the Faraday element 10.

According to the first embodiment, as hereinabove described, the coercive force of the high coercive force region 4b can be improved without substantially causing reduction of the residual magnetic flux density when the third magnet 4 is formed by the R—Fe—B-based sintered magnet mainly containing the rare earth element R (mainly composed of Nd and Pr, and containing Nd by at least 50%), the transition element mainly composed of Fe and B (boron), and the high coercive force region 4b is formed by introducing the heavy rare earth element RH consisting of at least either one of Dy and Tb from the whole region of the inner peripheral surface of the through-hole 4a for substituting the same for the light rare earth element RL (Nd or Pr) located on the outer periphery (in the vicinity of the grain boundary) of the main phase formed by the crystal grains of the tetragonal $R_2Fe_{14}B$-type compound. Thus, the coercive force of the high coercive force region 4b can be easily improved while maintaining the magnetic field strength of the magnetic circuit 1 for a Faraday rotator.

According to the first embodiment, as hereinabove described, the high coercive force region 4b can be provided in the through-hole 4a of the third magnet 4 easily causing irreversible demagnetization resulting from a reverse magnetic field over the range of 3 mm from the inner peripheral surface when forming the high coercive force region 4b up to the depth (thickness) L6 of at least 3 mm from the inner peripheral surface of the through-hole 4a toward the inner part (arrow A direction) of the third magnet 4, whereby irreversible demagnetization in the third magnet 4 can be further suppressed. Therefore, the magnetic circuit 1 for a Faraday rotator according to the first embodiment is optimum for a Faraday rotator employing TGG for a Faraday element.

According to the first embodiment, as hereinabove described, not only the high coercive force region 4b of the third magnet 4 but also the portions of the third magnet 4 other than the high coercive force region 4b have high coercive force when the magnetic circuit 1 for a Faraday rotator is so formed that the third magnet 4 is formed by the same R—Fe—B-based sintered magnet as the R—Fe—B-based sintered magnets of the first magnet 2 and the second magnet 3 or an R—Fe—B-based sintered magnet having higher coercive force than the R—Fe—B-based sintered magnets of the first magnet 2 and the second magnet 3, whereby the whole of the third magnet 4 can be inhibited from irreversible demagnetization resulting from the high coercive force region 4b being irreversibly demagnetized.

According to the first embodiment, as hereinabove described, the third magnet 4 can be inhibited from irreversible demagnetization not only by the high coercive force region 4b but also by the portions of the third magnet 4, other than the high coercive force region 4b, having the high coercive force of at least 2350 kA/m, when forming the magnetic circuit 1 for a Faraday rotator so that the coercive force of the portions of the third magnet 4 other than the high coercive force region 4b is at least 2350 kA/m and smaller than the coercive force of the high coercive force region 4b.

According to the first embodiment, as hereinabove described, sufficient magnetic field strength (at least about 1.5 T and not more than about 3.0 T) can be generated also in the miniature Faraday rotator 100 employing the crystal of terbium gallium garnet (TGG) as the Faraday element 10, when forming the magnetic circuit 1 for a Faraday rotator so that the third magnet 4 has residual magnetic flux density of at least about 1.0 T.

According to the first embodiment, as hereinabove described, the magnetic circuit 1 for a Faraday rotator is preferably so formed that the outer diameters L1 of the first magnet 2, the second magnet 3 and the third magnet 4 are about 10 times the diameters L2 of the through-holes 2a, 3a and 4a. The magnetic circuit 1 for a Faraday rotator is so formed that the outer diameters L1 of the first magnet 2, the second magnet 3 and the third magnet 4 are about 10 times the diameters L2 of the through-holes 2a, 3a and 4a, whereby formation of high magnetic field strength can be inhibited from being difficult in the magnetic circuit 1 for a Faraday rotator, and the high coercive force region 4b can be inhibited from easily causing irreversible demagnetization due to excessively high magnetic field strength in the magnetic circuit 1 for a Faraday rotator.

First Modification of First Embodiment

A first modification of the first embodiment of the present invention is now described with reference to FIGS. 4 and 5. In relation to a Faraday rotator 200 according to this first modification of the first embodiment, a case of constituting one first magnet 202 and one second magnet 203 by combining eight magnet pieces 220 and eight magnet pieces 230 having arcuate (sectorial) sectional shapes respectively in a magnetic circuit 201 for a Faraday rotator dissimilarly to the aforementioned embodiment is described.

Figure 4:
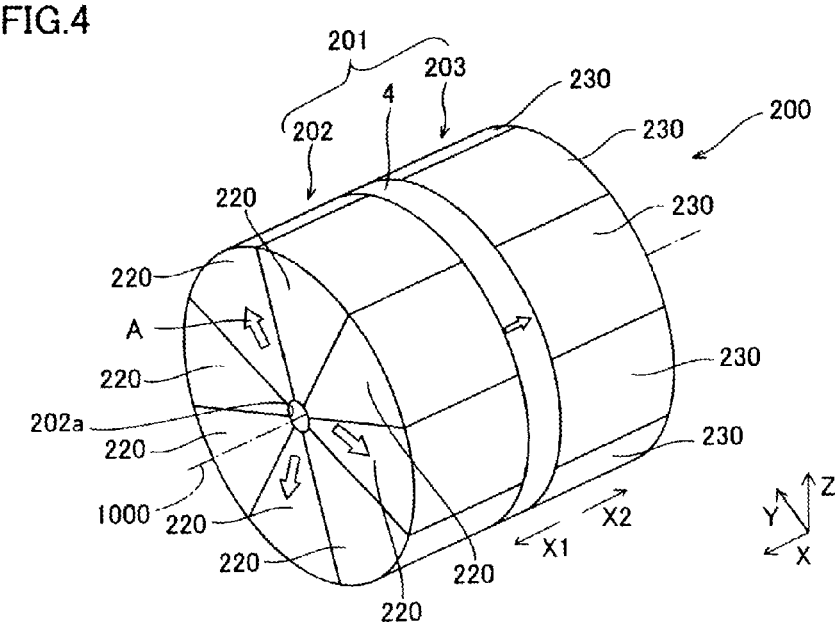
FIG. 4 A perspective view showing the structure of a Faraday rotator according to a first modification of the first embodiment of the present invention.
Figure 5:
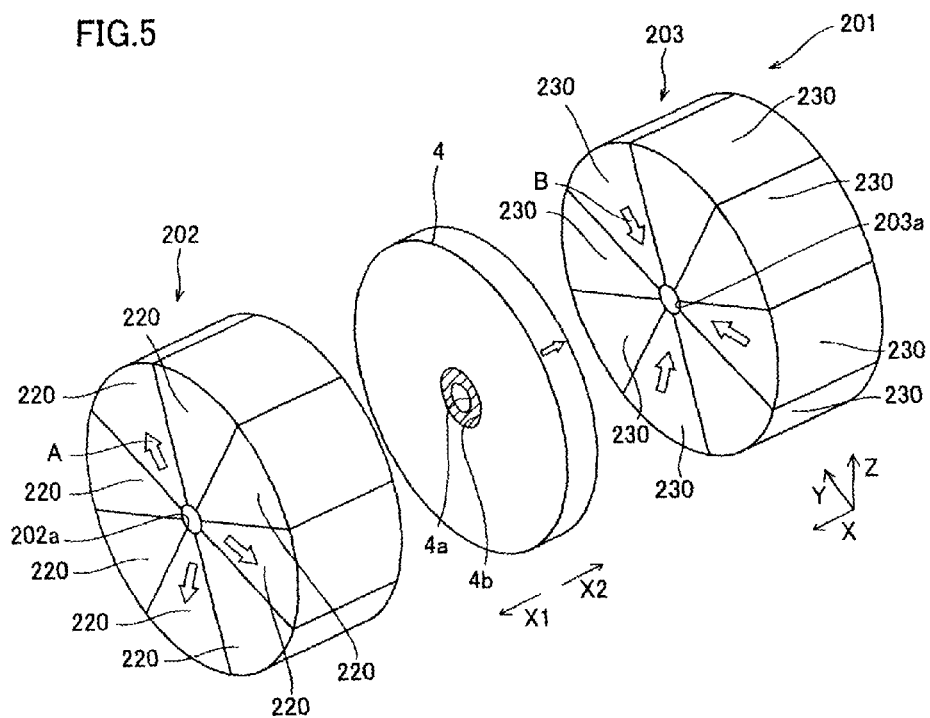
FIG. 5 An exploded perspective view showing the structure of a magnetic circuit for a Faraday rotator according to the first modification of the first embodiment of the present invention.

The magnetic circuit 201 for a Faraday rotator in the Faraday rotator 200 according to the first modification of the first embodiment of the present invention is formed by the first magnet 202, the second magnet 203 and a third magnet 4 having cylindrical shapes, as shown in FIGS. 4 and 5. The first magnet 202 and the second magnet 203 have the same shapes. The first magnet 202, the second magnet 203 and the third magnet 4 are arranged along the same central axis 1000 extending in an X direction.

Through-holes 202a and 203a extending in the X direction are formed at the centers of sections (Y-Z plane) of the first magnet 202 and the second magnet 203 respectively. The through-holes 203a and 203a are examples of the "first through-hole" and the "second through-hole" in the present invention respectively.

The first magnet 202 and the second magnet 203 are constituted by combining the eight magnet pieces 220 and the eight magnet pieces 230 formed by radially dividing the same from the central axis 1000 toward the sides of the outer peripheral surfaces of the first magnet 202 and the second magnet 203 respectively. The eight magnet pieces 220 and the eight magnet pieces 230 are formed to extend in the X direction in the Y-Z plane orthogonal to the axial direction (X direction), in a state having the same arcuate (sectorial) sections. The magnet pieces 220 and 230 are so formed that the angles of the arcs thereof are both about 45 degrees. The remaining structure according to the first modification of the first embodiment is similar to that of the first embodiment.

A manufacturing process for the Faraday rotator 200 according to the first modification of the first embodiment of the present invention is now described with reference to FIG. 5.

First, eight magnet body pieces corresponding to the eight magnet pieces 220, eight magnet body pieces corresponding to the eight magnet pieces 230 and a third magnet body having a cylindrical shape and provided with a through-hole 4a are prepared. The eight magnet body pieces corresponding to the eight magnet pieces 220 and the eight magnet body pieces corresponding to the eight magnet pieces 230 are formed to extend in the X direction, in a state having the same arcuate (sectorial) sections.

Thereafter the eight magnet pieces 220 are formed by magnetizing the eight magnet body pieces corresponding to the eight magnet pieces 220 in a direction (arrow A direction) perpendicular to the axial direction (X direction) and separating from a portion corresponding to the through-hole 202a. Further, the eight magnet pieces 230 are formed by magnetizing the eight magnet body pieces corresponding to the eight magnet pieces 230 in a direction (arrow B direction) perpendicular to the axial direction (X direction) and directed toward a portion corresponding to the through-hole 203a.

Then, the eight magnet pieces 220 and the eight magnet pieces 230 are circumferentially arranged to form through-holes 202a and 203a respectively, as shown in FIG. 5. Then, the eight magnet pieces 220 and the eight magnet pieces 230 are bonded to each other with a two-part mixed adhesive. Thus, the first magnet 202 and the second magnet 203 are formed. The remaining steps of the manufacturing process according to the first modification of the first embodiment are similar to those in the first embodiment.

Effects of the first modification of the first embodiment are similar to those of the first embodiment.

Second Modification of First Embodiment

A second modification of the first embodiment of the present invention is now described with reference to FIGS. 6 and 7. In relation to a Faraday rotator 300 according to this second modification of the first embodiment, a case of constituting one first magnet 302 and one second magnet 303 by combining eight magnet pieces 320 and eight magnet pieces 330 having quadrangular prismatic shapes in a magnetic circuit 301 for a Faraday rotator dissimilarly to the aforementioned embodiment is described.

Figure 6:
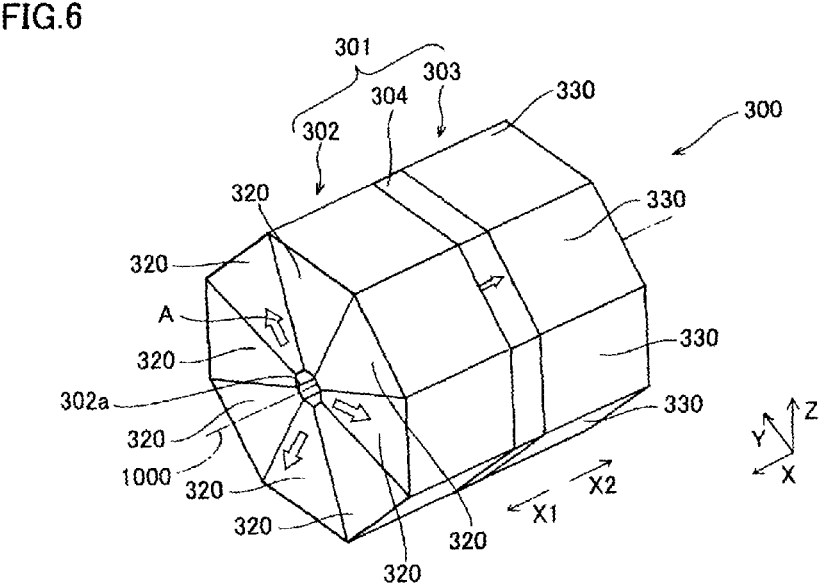
FIG. 6 A perspective view showing the structure of a Faraday rotator according to a second modification of the first embodiment of the present invention.
Figure 7:
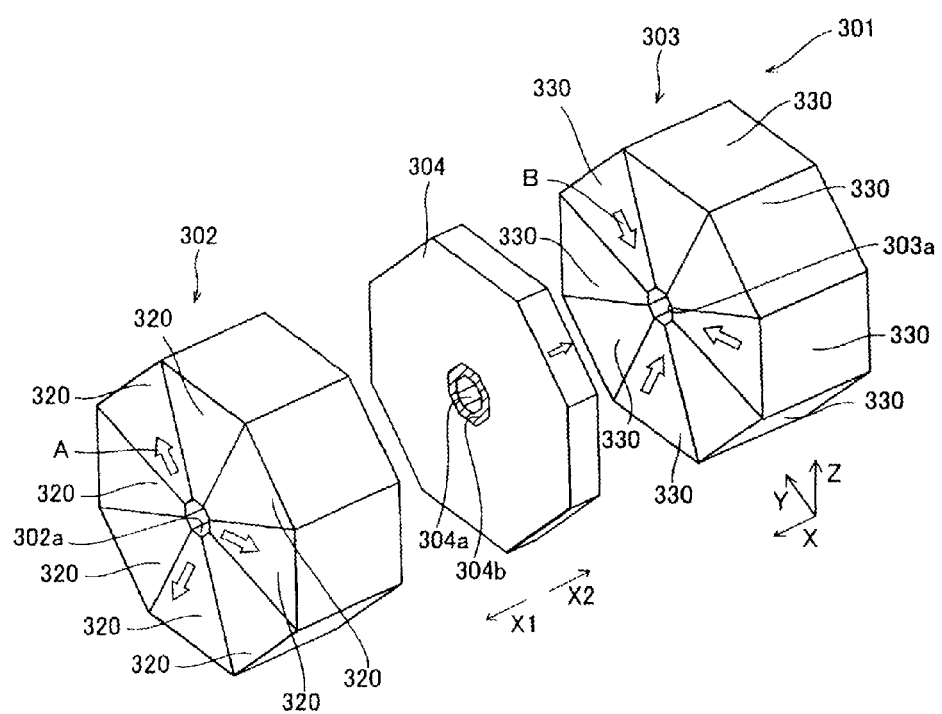
FIG. 7 An exploded perspective view showing the structure of a magnetic circuit for a Faraday rotator according to the second modification of the first embodiment of the present invention.

The magnetic circuit 301 for a Faraday rotator in the Faraday rotator 300 according to the second modification of the first embodiment of the present invention is formed by the first magnet 302, the second magnet 303 and a third magnet 304 having regular octagonal prismatic shapes, as shown in FIGS. 6 and 7. The first magnet 302 and the second magnet 303 have the same shapes. The first magnet 302, the second magnet 303 and the third magnet 304 are arranged along the same central axis 1000 extending in an X direction.

The first magnet 302, the second magnet 303 and the third magnet 304 are formed to extend in the X direction together, in the state having regular octagonal sectional shapes in a Y-Z plane orthogonal to an axial direction (X direction) along the central axis 1000. Through-holes 302a, 303a and 304a extending in the X direction are formed at the centers of the sections (Y-Z plane) of the first magnet 302, the second magnet 303 and the third magnet 304 respectively. These through-holes 302a, 303a and 304a have regular octagonal sections (Y-Z plane). The through-holes 302a, 303a and 304a are examples of the "first through-hole", the "second through-hole" and the "third through-hole" in the present invention respectively.

The first magnet 302 and the second magnet 303 are constituted by combining the eight magnet pieces 320 and the eight magnet pieces 330 formed by radially dividing the same from the central axis 1000 toward the sides of the outer peripheral surfaces of the first magnet 302 and the second magnet 303 respectively. The eight magnet pieces 320 and the eight magnet pieces 330 have quadrangular prismatic shapes, and are formed to extend in the X direction in a state having the same trapezoidal sections in the Y-Z plane orthogonal to the axial direction (X direction).

A high coercive force region 304b is formed on the third magnet 304. This high coercive force region 304b is layeredly and circumferentially formed to surround the inner peripheral surface over the whole region of the inner peripheral surface of the through-hole 304a. The remaining structure according to the second modification of the first embodiment is similar to that of the first embodiment.

A manufacturing process for the Faraday rotator 300 according to the second modification of the first embodiment of the present invention is now described with reference to FIG. 7.

First, eight magnet body pieces corresponding to the eight magnet pieces 320, eight magnet body pieces corresponding to the eight magnet pieces 330 and a third magnet body having a regular octagonal prismatic shape and provided with a through-hole 304a are prepared. The eight magnet body pieces corresponding to the eight magnet pieces 320 and the eight magnet body pieces corresponding to the eight magnet pieces 330 are formed to extend in the X direction in a state having the same trapezoidal sections. The third magnet body corresponds to the third magnet 304 not yet magnetized.

Then, the high coercive force region 304b is layeredly and circumferentially formed to surround the inner peripheral surface over the whole region of the inner peripheral surface of the through-hole 304a of the third magnet body.

Thereafter the eight magnet pieces 320 are formed by magnetizing the eight magnet body pieces corresponding to the eight magnet pieces 320 in the direction (arrow A direction) perpendicular to the axial direction (X direction) and separating from a portion corresponding to the through-hole 302a. Further, the eight magnet pieces 330 are formed by magnetizing the eight magnet body pieces corresponding to the eight magnet pieces 330 in a direction (arrow B direction) perpendicular to the axial direction (X direction) and directed toward a portion corresponding to the through-hole 303a. In addition, the third magnet 304 is formed by magnetizing the third magnet body corresponding to the third magnet 304 in a direction (arrow X2 direction) parallel to the axial direction (X direction) and directed from the first magnet 302 (first magnet body) toward the second magnet 303 (second magnet body).

Then, the eight magnet pieces 320 and the eight magnet pieces 330 are circumferentially arranged to form the through-holes 302a and 303a respectively, as shown in FIG. 7. Then, the eight magnet pieces 320 and the eight magnet pieces 330 are bonded to each other with a two-part mixed adhesive. Thus, the first magnet 302 and the second magnet 303 are formed. The remaining steps of the manufacturing process according to the second modification of the first embodiment are similar to those of the first embodiment.

Effects according to the second modification of the first embodiment are similar to those of the first embodiment.

Example 1

A simulation of a distributed state of a permeance coefficient and irreversible demagnetization temperature measurement conducted in order to confirm the compositions of the magnetic circuits 1, 200 and 300 for Faraday rotators according to the aforementioned first embodiment and the first and second modifications of the aforementioned first embodiment are now described with reference to FIGS. 1 to 8.

(Simulation of Distributed State of Permeance Coefficient)

First, the simulation of the distributed state of the permeance coefficient is described with reference to FIGS. 1, 2 and 8. In the simulation of the distributed state of the permeance coefficient, the magnetic circuit 1 for a Faraday rotator formed by the first magnet 2, the second magnet 3 and the third magnet 4 corresponding to the first embodiment shown in FIGS. 1 and 2 was assumed, to obtain the distributed state of the permeance coefficient in the magnetic circuit 1 for a Faraday rotator by the simulation. The permeance coefficient denotes inclination of a straight line connecting a magnet operating point and the origin in a demagnetization curve showing the characteristics of a magnet. It is indicated that irreversible demagnetization hardly takes place in the magnet if this permeance is large, while it is indicated that irreversible demagnetization easily takes place in the magnet if the permeance coefficient is small.

As a specific structure, it was assumed that the outer diameters L1 in the sections (Y-Z plane) of the first magnet 2, the second magnet 3 and the third magnet 4 were 50 mm, and the diameters L2 of the through-holes 2a, 3a and 4a were 5 mm, as shown in FIG. 2. Further, it was assumed that the lengths L4 of the first magnet 2 and the second magnet 3 in the X direction were both 20 mm, and the length L5 of the third magnet 4 in the X direction was 5 mm.

In addition, it was assumed that the first magnet 2 and the second magnet 3 had residual magnetic flux density of 1.30 T and coercive force of 1270 kA/m. Further, it was assumed that the third magnet 4 had residual magnetic flux density of 1.14 T and coercive force of 2350 kA/m.

Figure 8:
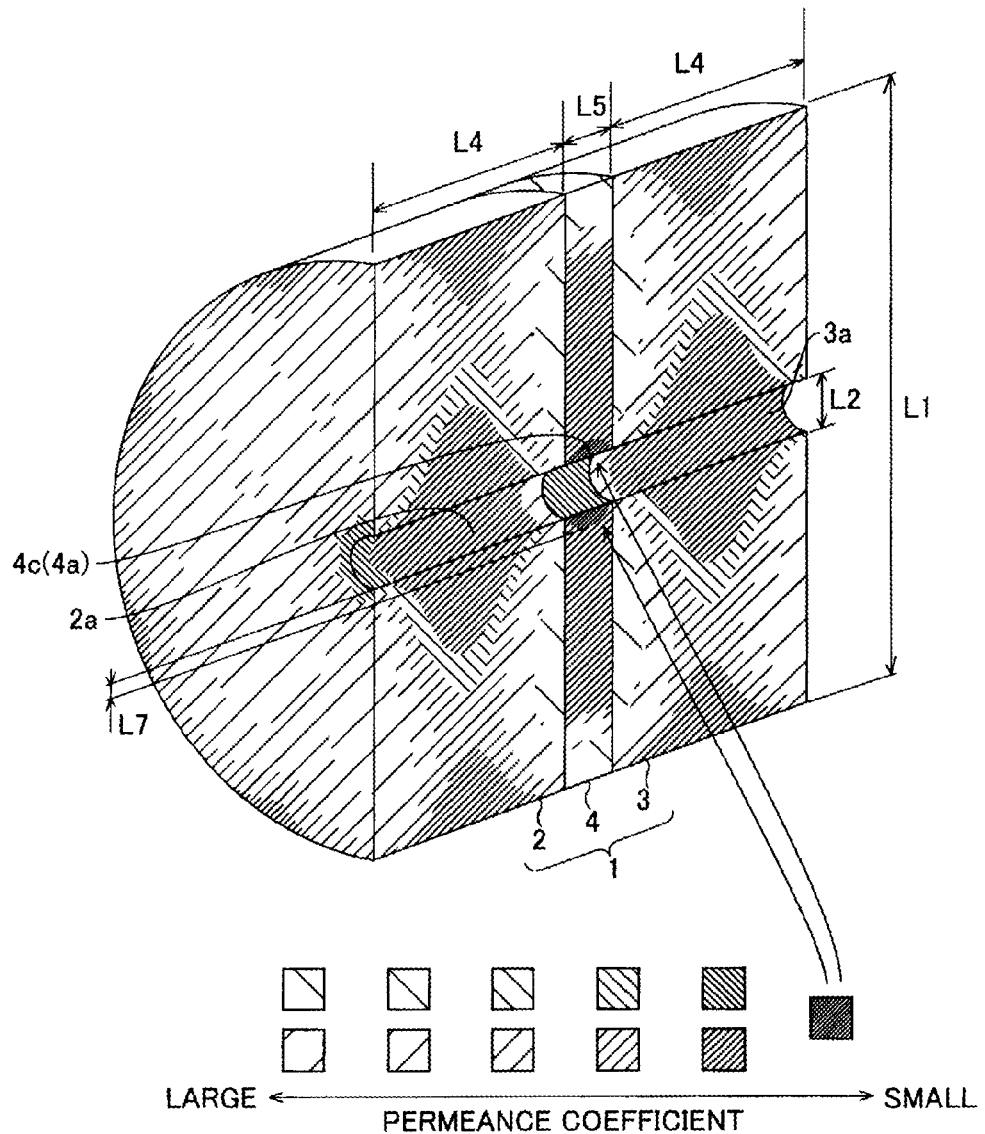
FIG. 8 A diagram showing results of a simulation conducted in order to confirm effects of the first embodiment of the present invention.

From the simulation results of the distributed state of the permeance coefficient shown in FIG. 8, it has been understood that the permeance coefficient is small and irreversible demagnetization easily takes place in the vicinity of the inner peripheral surface of the through-hole 4a of the third magnet 4. Thus, it has been proved that the third magnet 4 can be inhibited from irreversible demagnetization by providing a high coercive force layer in the vicinity of at least the inner peripheral surface of the through-hole 4a of the third magnet 4.

In particular, it has been understood that the permeance coefficient is small and irreversible demagnetization easily takes place on the central portion 4c of the third magnet 4 along the X direction in the inner peripheral surface of the through-hole 4a of the third magnet 4. Further, it has been understood that a region having a small permeance coefficient is present on the central portion 4c up to a deeper position from the inner peripheral surface of the through-hole 4a, than another portion of the inner peripheral surface of the through-hole 4a. In addition, it has been understood the region having the small permeance coefficient is formed up to the range of 3 mm (distance L7) from the inner peripheral surface of the through-hole 4a on the central portion 4c of the third magnet 4. Thus, it has been proved that the third magnet 4 can be further inhibited from irreversible demagnetization by providing the high coercive force region 4b up to a depth of at least 3 mm from the inner peripheral surface of the through-hole 4a at least on the central portion 4c of the third magnet 4.

(Irreversible Demagnetization Temperature Measurement)

The irreversible demagnetization temperature measurement is now described with reference to FIGS. 2, 5 and 7. In the irreversible demagnetization temperature measurement, the magnetic circuit 201 for a Faraday rotator including the third magnet 4 provided with the high coercive force region 4b shown in FIG. 5 was prepared as Example 1 corresponding to the first modification of the aforementioned first embodiment. Further, a magnetic circuit for a Faraday rotator including a third magnet provided with no high coercive force region was prepared as comparative example 1 for Example 1.

More specifically, each of Example 1 and comparative example 1 was so constituted that all of a first magnet, a second magnet and a third magnet were formed by R—Fe—B-based sintered magnets (NMX__33UH by Hitachi Metals, Ltd.) having residual magnetic flux density of 1.14 T and coercive force of 2350 kA/m.

The magnetic circuit 301 for a Faraday rotator including the third magnet 304 provided with the high coercive force region 304b shown in FIG. 7 was prepared as Example 2 corresponding to the second modification of the aforementioned first embodiment. On the other hand, a magnetic circuit for a Faraday rotator including a third magnet provided with no high coercive force region was prepared as comparative example 2 for Example 2.

More specifically, each of Example 2 and comparative example 2 was so constituted that both of a first magnet and a second magnet were formed by R—Fe—B-based sintered magnets (NMX_43SH by Hitachi Metals, Ltd.) having residual magnetic flux density of 1.30 T and coercive force of 1270 kA/m. Further, each of Example 2 and comparative example 2 was so constituted that a third magnet was formed by an R—Fe—B-based sintered magnet (NMX_33UH by Hitachi Metals, Ltd.) having residual magnetic flux density of 1.14 T and coercive force of 2350 kA/m.

The magnetic circuit 201 for a Faraday rotator including the third magnet 4 provided with the high coercive force region 4b shown in FIG. 5 was prepared as Example 3 corresponding to the first modification of the aforementioned first embodiment. Further, a magnetic circuit for a Faraday rotator including a third magnet provided with no high coercive force region was prepared as comparative example 3 for Example 3.

More specifically, each of Example 3 and comparative example 3 was so constituted that both of a first magnet and a second magnet were formed by R—Fe—B-based sintered magnets (NMX_43SH by Hitachi Metals, Ltd.) having residual magnetic flux density of 1.30 T and coercive force of 1270 kA/m. Further, each of Example 3 and comparative example 3 was so constituted that a third magnet was formed by an R—Fe—B-based sintered magnet (NMX_33UH by Hitachi Metals, Ltd.) having residual magnetic flux density of 1.14 T and coercive force of 2350 kA/m.

Each of Examples 1 to 3 and comparative examples 1 to 3 was so constituted that the outer diameters L1 (see FIG. 2) in sections (Y-Z plane) of the first magnet, the second magnet and the third magnet were 50 mm and the diameters L2 (see FIG. 2) of the through-holes were 5 mm. Further, each of Examples 1 to 3 and comparative examples 1 to 3 was so constituted that the lengths L4 (see FIG. 2) of the first magnet and the second magnet in the X direction were 20 mm and the length L5 (see FIG. 2) of the third magnet in the X direction was 5 mm. The residual magnetic flux density and the coercive force were measured with a B-H tracer.

In each of Examples 1 to 3, the high coercive force region 4b (304b) was layeredly and circumferentially formed to surround the inner peripheral surface over the whole region of the inner peripheral surface of the through-hole 4a (304a) of the third magnet 4 (304). More specifically, a bulk body serving as an RH diffusion source and the third magnet were heated to 900° C. in an opposedly arranged state by the method described in WO2007/102391, so that the heavy rare earth element RH consisting of Dy was introduced from the side of the inner peripheral surface of the through-hole 4a (304a) of the third magnet body and diffused into the third magnet body. Further, heat treatment was performed at 800° C. Thus, the high coercive force region 4b (304b) was formed by substituting the heavy rare earth element RL in the rare earth element of the $R_2Fe_{14}B$-type compound located on the outer periphery (in the vicinity of the grain boundary) of the main phase by the heavy rare earth element RH. Further, the high coercive force region 4b (304b) was formed up to the depth (thickness) L6 (see FIG. 2) of 3 mm from the inner peripheral surface of the through-hole 4a (304a) toward the inner part (arrow A direction) of the third magnet 4 (304).

In each of Examples 1 to 3 and comparative examples 1 to 3, the first magnet, the third magnet and the second magnet were bonded to each other with a two-part mixed adhesive from the X1 side toward the X2 side.

In each of Examples 1 and 2 and comparative examples 1 and 2 under a temperature condition of room temperature (20° C.), magnetic field strength in the through-hole (third through-hole) in which the Faraday element was arranged was measured with a magnetic probe (not shown).

In each of Examples 1 and 2 and comparative examples 1 and 2 under the temperature condition of room temperature (20° C.), residual magnetic flux density and coercive force on the inner peripheral surface of the through-hole of the third magnet were measured with a B-H tracer. The residual magnetic flux density and the coercive force on the inner peripheral surface of the through-hole 4a of the third magnet 4 in each of Examples 1 and 2 were measured with the B-H tracer by preparing the same magnet (NMX-33UH) as the third magnets of Examples 1 and 2 under the same RH diffusion condition and cutting out only the high coercive force region 4b (304b).

In each of Examples 1 and 2 and comparative examples 1 and 2, a temperature history was added to the magnetic circuit for a Faraday rotator by increasing the temperature from room temperature (20° C.) to prescribed levels (55° C., 70° C. and 80° C.) and thereafter reducing the temperature to 20° C. again. Magnetic field strength in the through-hole of the third magnet after the addition of the temperature history was measured with the magnetic probe (not shown). At this time, it was determined that irreversible demagnetization took place when the value of the magnetic field strength after the addition of the temperature history was less than 99% of the value of the magnetic field strength before the addition of the temperature history, and the prescribed temperature (55° C., 70° C. or 80° C.) at the time when the irreversible demagnetization took place was regarded as the irreversible demagnetization temperature. Table 1 shows the results.

TABLE 1

|  | Magnetic Strength (T) | Coercive Force of High Coercive Force Region (kA/m) | Irreversible Demagnetization Temperature (° C.) |
|---|---|---|---|
| Example1 | 2.0 | 2800 | — |
| Example2 | 2.3 | 2800 | — |
| Comparative Example 1 | 2.0 | 2350 | 55 |
| Comparative Example 2 | 2.3 | 1680 | 20 |

In the magnetic circuit for a Faraday rotator according to each of Example 3 and comparative example 3, a temperature history was added to the magnetic circuit for a Faraday rotator by increasing the temperature from room temperature (20° C.) to prescribed levels (55° C., 70° C., 80° C. and 100° C.) and thereafter reducing the temperature to 20° C. again. The magnitude (3) of magnetic field strength after the addition of the temperature history with respect to magnetic field strength before the addition of the temperature history was measured. Table 2 shows the results.

TABLE 2

|  |  | Temperature History | | | | |
|---|---|---|---|---|---|---|
|  |  | 20° C. | 55° C. | 70° C. | 80° C. | 100° C. |
| Example 1 | Analytical Value | 100% | 100% | 99.2% | 98.8% | 91.4% |

TABLE 2-continued

|  |  | Temperature History | | | | |
|---|---|---|---|---|---|---|
|  |  | 20° C. | 55° C. | 70° C. | 80° C. | 100° C. |
|  | Found Value | 100% | 99.7% | 99.7% | 99.3% | 96.2% |
| Comparative Example 3 | Analytical Value | 100% | 97.9% | 93.8% | 90.9% | 84.4% |
|  | Found Value | 100% | 99.4% | 97.2% | 93.5% | 86.4% |

As the experimental results shown in Table 1, the magnetic field strength (2.3 T) of each of Example 2 and comparative example 2 employing the R—Fe—B-based sintered magnets having the residual magnetic flux density of 1.30 T for the first and second magnets was larger than the magnetic field strength (2.0 T) of each of Example 1 and comparative example 1 employing the R—Fe—B-based sintered magnets having the residual magnetic flux density of 1.14 T for the first and second magnets.

In each of Examples 1 and 2 having the third magnet 4 (304) provided with the high coercive force region 4b (304b), coercive force on the inner peripheral surface of the through-hole of the third magnet was 2800 kA/m, and larger than the coercive force (2350 kA/m) in the portions of the third magnet 4 (304) other than the high coercive force region 4b (304b). Comparative example 1 having the third magnet provided with no high coercive force region reached ordinary coercive force (2350 kA/m) of the third magnet, while coercive force reached 1680 kA/m in comparative example 2 having the third magnet provided with no high coercive force region. This is conceivably because the magnetic field strength (2.3 T) of comparative example 2 was higher than the magnetic field strength (2.0 T) of comparative example 1 and hence irreversible demagnetization already took place on the third magnet due to a reverse magnetic field resulting from the magnetic field constituted of the first magnet and the second magnet in the stage of manufacturing the magnetic circuit for a Faraday rotator according to comparative example 2.

In each of Examples 1 and 2 having the third magnet 4 (304) provided with the high coercive force region 4b (304b) shown in Table 1, the irreversible demagnetization temperature was impossible to measure. In other words, the irreversible demagnetization temperatures of Examples 1 and 2 were higher than 80° C. In the found values of Example 3 having the third magnet 4 provided with the high coercive force region 4b shown in Table 2, the value of the magnetic field strength after the addition of the temperature history was at least 99% of the value of the magnetic field strength before the addition of the temperature history in the temperature range of not more than 80° C., while the value of the magnetic field strength after the addition of the temperature history was less than 99% of the value of the magnetic field strength before the addition of the temperature history at 100° C. This is conceivably because the high coercive force region 4b (304b) was provided in the vicinity of the inner peripheral surface of the through-hole 4a (304a) of the third magnet 4 (304) easily causing irreversible demagnetization and hence irreversible demagnetization was suppressible in the temperature range of not more than 80° C. in each of Examples 1 to 3.

In comparative example 1 having the third magnet provided with no high coercive force region, on the other hand, the irreversible demagnetization temperature was 55° C. In the found values of comparative example 3 having the third magnet provided with no high coercive force region shown in Table 2, the value of the magnetic field strength after the addition of the temperature history was at least 99% of the value of the magnetic field strength before the addition of the temperature history in the temperature range of not more than 55° C., while the value of the magnetic field strength after the addition of the temperature history was less than 99% of the value of the magnetic field strength before the addition of the temperature history in the temperature range of at least 70° C. In other words, the irreversible demagnetization temperature of comparative example 3 was 70° C. As to this, it is conceivable that irreversible demagnetization took place in the vicinity of the inner peripheral surface of the through-hole of the third magnet in the temperature range (comparative example 1) of at least 55° C. and the temperature range (comparative example 3) of at least 70° C. in each of comparative examples 1 and 3. It is further conceivable that the remaining regions of the third magnet were also irreversibly demagnetized from the irreversibly demagnetized portion and hence the value of the magnetic field strength after the addition of the temperature history became less than 99% of the value of the magnetic field strength before the addition of the temperature history.

Second Embodiment

A second embodiment of the present invention is now described with reference to FIGS. 9 and 10. In relation to a Faraday rotator 400 according to this second embodiment, such a case that first magnets 2 and second magnets 3 of a magnetic circuit 401 for a Faraday rotator are alternately arranged along an axial direction where a central axis 1000 extends while holding third magnets 4 therebetween dissimilarly to the aforementioned embodiment is described.

Figure 9:
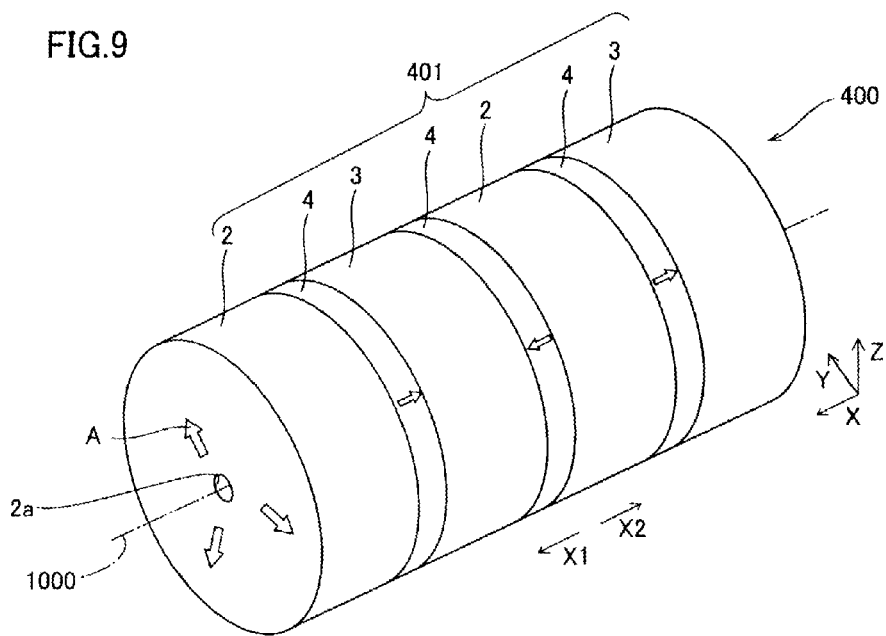
FIG. 9 A perspective view showing the structure of a Faraday rotator according to a second embodiment of the present invention.

The magnetic circuit 401 for a Faraday rotator in the Faraday rotator 400 according to the second embodiment of the present invention is formed by two first magnets 2, two second magnets 3 and three third magnets 4 having cylindrical shapes, as shown in FIG. 9. In the magnetic circuit 401 for a Faraday rotator, the first magnets 2 and the second magnets 3 are arranged to alternately line up while holding the third magnets 4 therebetween along the axial direction (X direction) where the central axis 1000 extends. More specifically, the first magnet 2, the third magnet 4, the second magnet 3, the third magnet 4, the first magnet 2, the third magnet 4 and the second magnet 3 are arranged in this order from an X1 side toward an X2 side.

The three third magnets 4 are magnetized in directions parallel to the axial direction (X direction) and directed from the first magnets 2 toward the second magnets 3. In other words, the third magnets 4 (two on the sides of both ends) adjacent to the first magnets 2 located on the X1 side are magnetized in an arrow X2 direction, while the third magnet 4 (one on the central side) adjacent to the first magnet 2 located on the X2 side is magnetized in an arrow X1 direction.

Figure 10:
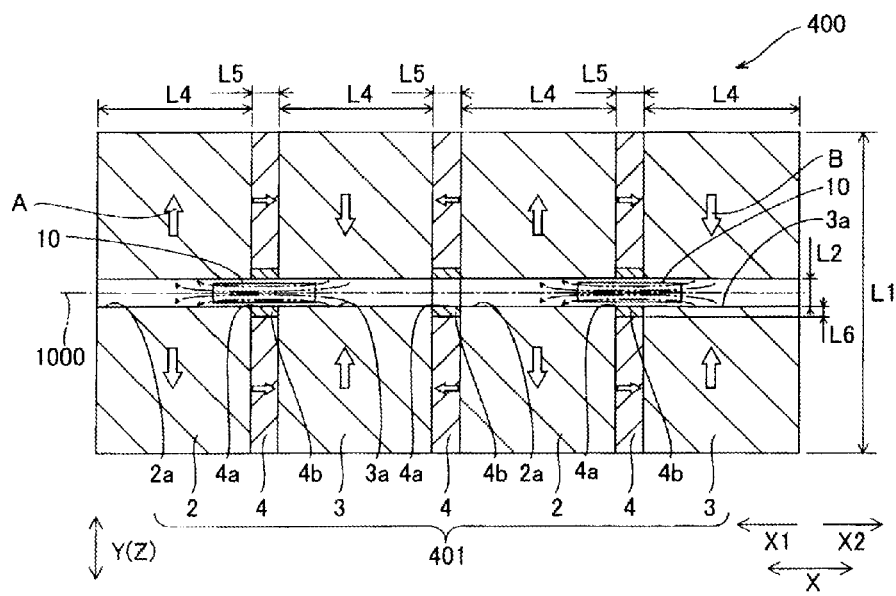
FIG. 10 A sectional view in a case of cutting the Faraday rotator according to the second embodiment of the present invention along a direction where a central axis extends.

As shown in FIG. 10, high coercive force regions 4b are formed in the vicinity of the inner peripheral surfaces of through-holes 4a of the three third magnets 4. These high coercive force regions 4b are layeredly and circumferentially formed to surround the inner peripheral surfaces over the whole regions of the inner peripheral surfaces of the through-holes 4a of the third magnets 4. The remaining structure according to the second embodiment is similar to that of the first embodiment.

A manufacturing process for the Faraday rotator 400 according to the second embodiment of the present invention is now described with reference to FIGS. 9 and 10.

First, the two first magnets 2, the two second magnets 3 and the three third magnets 4 are formed by a manufacturing process similar to that of the first embodiment.

Thereafter the two first magnets 2, the two second magnets 3 and the three third magnets 4 are arranged in the order of the first magnet 2, the third magnet 4, the second magnet 3, the third magnet 4, the first magnet 2, the third magnet 4 and the second magnet 3 from the X1 side toward the X2 side. Then, the arranged first, second and third magnets 2, 3 and 4 are bonded to each other with a two-part mixed adhesive. At this time, the third magnets 4 (two on the sides of both ends) adjacent to the first magnets 2 located on the X1 side are so arranged that the direction of magnetization is the arrow X2 direction, while the third magnet 4 (one on the central side) adjacent to the first magnet 2 located on the X2 side is so arranged that the direction of magnetization is the arrow X1 direction. Thus, the magnetic circuit 401 for a Faraday rotator is formed. The remaining steps of the manufacturing process according to the second embodiment are similar to those of the first embodiment.

According to the second embodiment, as hereinabove described, the high coercive force regions 4b are layeredly and circumferentially formed to surround the inner peripheral surfaces over the whole regions of the inner peripheral surfaces of the through-holes 4a of the three third magnets 4 so that the high coercive force regions 4b having higher coercive force than the remaining portions can be provided to surround the inner peripheral surfaces over the whole regions of the inner peripheral surfaces of the through-holes 4a of the third magnets 4 easily causing irreversible demagnetization, whereby irreversible demagnetization in the whole of the high coercive force regions 4b and the third magnets 4 can be suppressed. Further, the high coercive force regions 4b have high coercive force, whereby irreversible demagnetization resulting from temperature rise can also be suppressed.

When arranging the first magnet 2, the third magnet 4, the second magnet 3, the third magnet 4, the first magnet 2, the third magnet 4 and the second magnet 3 in this order from the X1 side toward the X2 side in the second embodiment, as hereinabove described, plurality of units of magnetic circuits 401 for Faraday rotators can be formed by arranging the first magnets 2 and the second magnets 3 to alternately line up along the axial direction while holding the third magnets 4 therebetween even in such a case that a sufficient Faraday effect cannot be attained in the Faraday rotator 100 having the magnetic circuit 1 for a Faraday rotator according to the first embodiment, whereby the Faraday rotator 400 can be so formed that a sufficient Faraday effect is attained. The remaining effects according to the second embodiment are similar to those of the first embodiment.

Modification of Second Embodiment

A modification of the second embodiment of the present invention is now described with reference to FIG. 11. In relation to a Faraday rotator 500 according to this modification of the second embodiment, a case of constituting one first magnet 200 and one second magnet 203 by combining eight magnet pieces 220 and eight magnet pieces 230 individually having arcuate (sectorial) sectional shapes respectively in a magnetic circuit 501 for a Faraday rotator dissimilarly to the aforementioned second embodiment is described.

Figure 11:
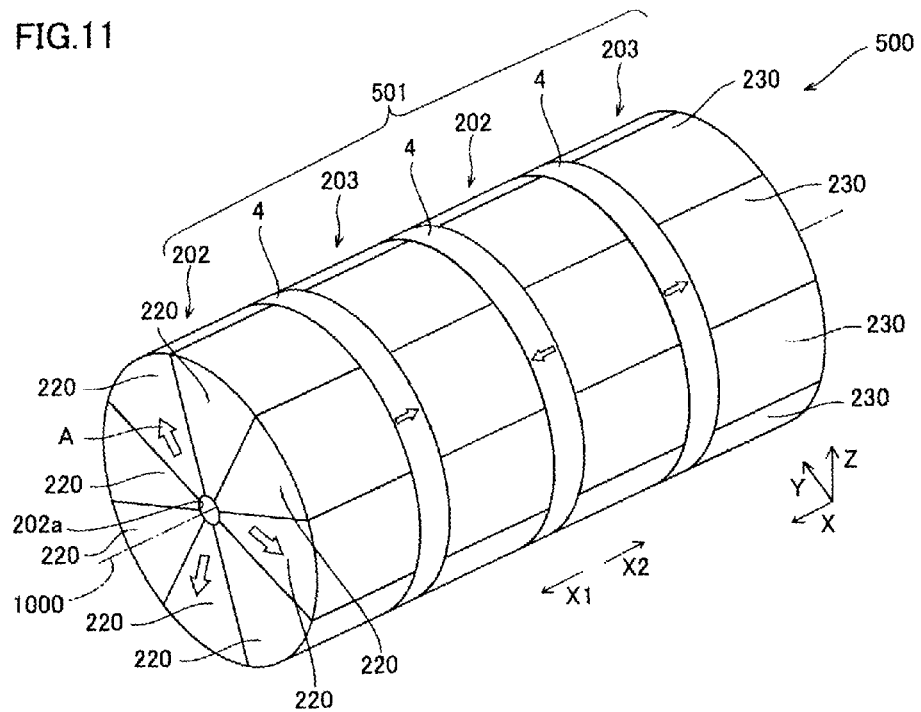
FIG. 11 A perspective view showing the structure of a Faraday rotator according to a modification of the second embodiment of the present invention.

The magnetic circuit 501 for a Faraday rotator in the Faraday rotator 500 according to the modification of the second embodiment of the present invention is formed by two first magnets 202, two second magnets 203 and three third magnets 4 having cylindrical shapes, as shown in FIG. 11. The first magnets 202 and the second magnets 203 have structures identical to those in the first modification of the aforementioned first embodiment. In other words, each first magnet 202 and each second magnet 203 are constituted by combining eight magnet pieces 220 and eight magnet pieces 230 respectively. The remaining structure according to the modification of the second embodiment is similar to that of the second embodiment.

In a manufacturing process for the Faraday rotator 500 according to the modification of the second embodiment of the present invention, the two first magnets 202 each obtained by combining the eight magnet pieces 220, the two second magnets 203 each obtained by combining the eight magnet pieces 230 and the three third magnets 4 are formed by a manufacturing process similar to that of the first modification of the first embodiment. The remaining steps of the manufacturing process according to the modification of the second embodiment are similar to those of the second embodiment.

Effects of the modification of the second embodiment are similar to those of the second embodiment.

Example 2

Irreversible demagnetization temperature measurement conducted in order to confirm the composition of the magnetic circuit 501 for a Faraday rotator according to the modification of the aforementioned second embodiment is now described with reference to FIGS. 10 and 11.

(Irreversible Demagnetization Temperature Measurement)

In the irreversible demagnetization temperature measurement, the magnetic circuit 501 for a Faraday rotator including the three third magnets 4 provided with the high coercive force regions 4b (see FIG. 10) was prepared as Example 4 corresponding to the modification of the second embodiment shown in FIG. 11. Further, a magnetic circuit for a Faraday rotator including three third magnets provided with no high coercive force regions was prepared as comparative example 4 for Example 4.

More specifically, each of Example 4 and comparative example 4 was so constituted that first and second magnets were formed by R—Fe—B-based sintered magnets (NMX_43SH by Hitachi Metals, Ltd.) having residual magnetic flux density of 1.30 T and coercive force of 1270 kA/m. Further, each of Example 4 and comparative example 4 was so constituted that third magnets were formed by R—Fe—B-based sintered magnets (NMX_33UH by Hitachi Metals, Ltd.) having residual magnetic flux density of 1.14 T and coercive force of 2350 kA/m.

Further each of Example 4 and comparative example 4 was so constituted that the outer diameters L1 (see FIG. 10) in sections (Y-Z plane) of the first magnets, the second magnets and the third magnets were 50 mm and the diameters L2 (see FIG. 10) of through-holes were 5 mm. Further, each of Example 4 and comparative example 4 was so constituted that the lengths L4 (see FIG. 10) of the first magnets and the second magnets in the X direction were 20 mm and the lengths L5 (see FIG. 10) of the third magnets in the X direction were 5 mm.

In Example 4, the high coercive force regions 4b were layeredly and circumferentially formed to surround the inner peripheral surfaces over the whole regions of the inner peripheral surfaces of the through-holes 4a of the three third magnets 4. Further, the high coercive force regions 4b were formed up to a depth (thickness) L6 (see FIG. 10) of 3 mm from the inner peripheral surfaces of the through-holes 4a up to inner parts (arrow A direction) of the third magnets 4.

In each of Example 4 and comparative example 4, the magnets were bonded to each other with a two-part mixed adhesive, to line up in the order of the first magnet, the third magnet, the second magnet, the third magnet, the first magnet, the third magnet and the second magnet from the X1 side toward the X2 side. At this time, the third magnets (two on the sides of both ends) adjacent to the first magnets located on the X1 side were so arranged that the direction of magnetization was the arrow X2 direction, while the third magnet (one on the central side) adjacent to the first magnet located on the X2 side was so arranged that the direction of magnetization was the arrow X1 direction.

In the magnetic circuit for a Faraday rotator according to each of Example 4 and comparative example 4, a temperature history was added to the magnetic circuit for a Faraday rotator by increasing the temperature from room temperature (20° C.) to prescribed levels (55° C., 70° C., 80° C. and 100° C.) and thereafter reducing the temperature to 20° C. again. The magnitude (%) of magnetic field strength after the addition of the temperature history with respect to magnetic field strength before the addition of the temperature history was measured. Table 3 shows the results.

TABLE 3

| | | Temperature History | | | | |
|---|---|---|---|---|---|---|
| | | 20° C. | 55° C. | 70° C. | 80° C. | 100° C. |
| Example 4 | Analytical Value | 100% | 100% | 99.9% | 99.6% | 93.2% |
| Comparative Example 4 | Analytical Value | 100% | 99.6% | 95.8% | 92.8% | 86.4% |

As the experimental results shown in Table 3, the value of the magnetic field strength after the addition of the temperature history was at least 99% of the value of the magnetic field strength before the addition of the temperature history in the temperature range of not more than 80° C. while the value of the magnetic field strength after the addition of the temperature history was less than 99% of the value of the magnetic field strength before the addition of the temperature history at 100° C. in Example 4 having the three third magnets 4 provided with the high coercive force regions 4b. In other words, the irreversible demagnetization temperature of Example 4 was 100° C. This is conceivably because the high coercive force regions 4b were provided in the vicinity of the inner peripheral surfaces of the through-holes 4a of the third magnets 4 easily causing irreversible demagnetization and hence irreversible demagnetization was suppressible in the range of not more than 80° C. in Example 4.

In comparative example 4 having the three third magnets provided with no high coercive force regions, on the other hand, the value of the magnetic field strength after the addition of the temperature history was at least 99% of the value of the magnetic field strength before the addition of the temperature history in the temperature range of not more than 55° C. while the value of the magnetic field strength after the addition of the temperature history was less than 99% of the value of the magnetic field strength before the addition of the temperature history in the temperature range of at least 70° C. In other words, the irreversible demagnetization temperature of comparative example 4 was 70° C. As to this, it is conceivable that irreversible demagnetization took place in the vicinity of the inner peripheral surfaces of the through-holes of the third magnets in the temperature range of at least 70° C. in comparative example 4. It is further conceivable that the remaining regions of the third magnet were also irreversibly demagnetized from the irreversibly demagnetized portions and hence the value of the magnetic field strength after the addition of the temperature history became less than 99% of the value of the magnetic field strength before the addition of the temperature history.

Third Embodiment

A third embodiment of the present invention is now described with reference to FIGS. 12 and 13. In relation to a Faraday rotator 600 according to this third embodiment, such a case that a third magnet 604 of a magnetic circuit 601 for a Faraday rotator is divided into two in a section (Y-Z plane) orthogonal to a central axis 1000 dissimilarly to the aforementioned embodiment is described.

Figure 12:
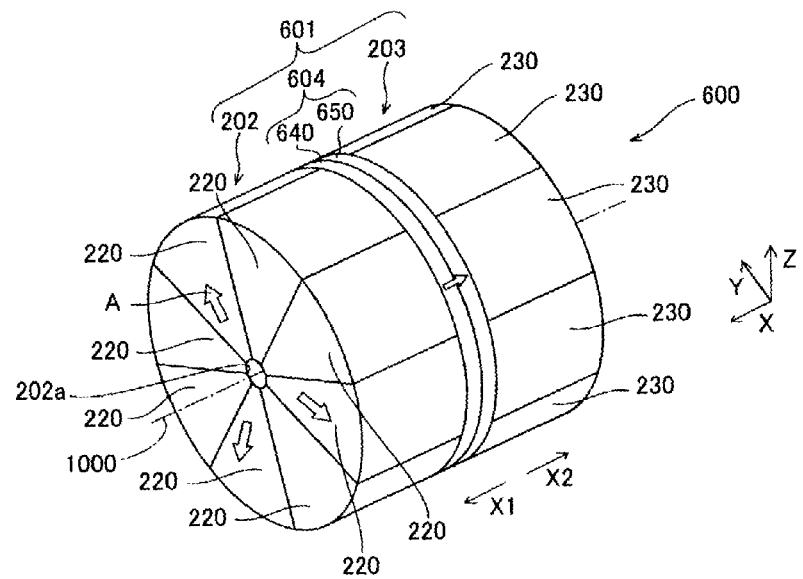
FIG. 12 A perspective view showing the structure of a Faraday rotator according to a third embodiment of the present invention.
Figure 13:
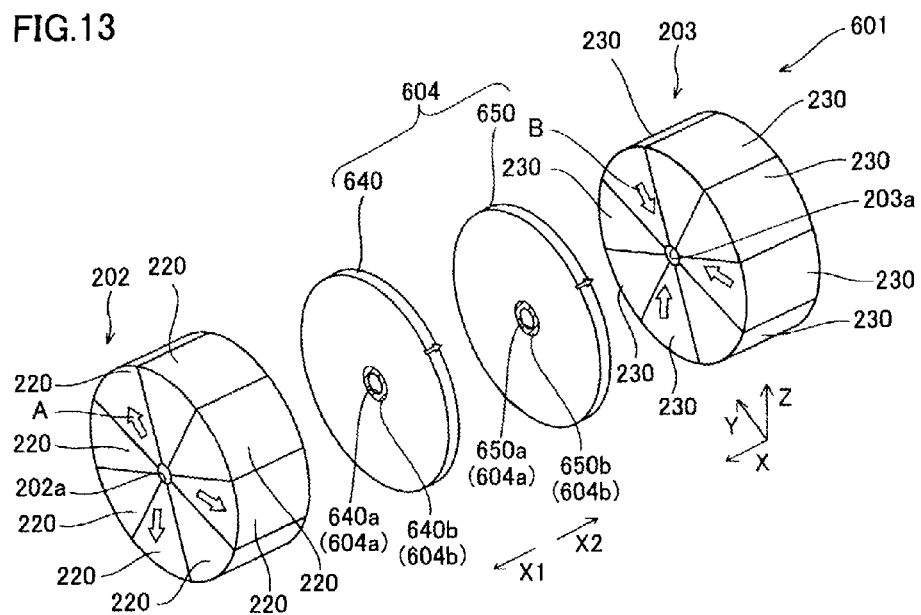
FIG. 13 An exploded perspective view showing the structure of a magnetic circuit for a Faraday circuit according to the third embodiment of the present invention.

In the magnetic circuit 601 for a Faraday rotator in the Faraday rotator 600 according to the third embodiment of the present invention, the cylindrical third magnet 604 is formed by combining a cylindrical magnet piece 640 located on an X1 side and a cylindrical magnet piece 650 located on an X2 side in an axial direction (X direction) along the central axis 1000, as shown in FIGS. 12 and 13. These magnet pieces 640 and 650 are formed by dividing the third magnet 604 on the X1 side and the X2 side through the Y-Z plane passing through the center of the third magnet 604 in the X direction. The magnet pieces 640 and 650 are examples of the "first magnet pieces" in the present invention.

The magnet pieces 640 and 650 have through-holes 640a and 650a and coercive force regions 640b and 650b respectively. A through-hole 604a is formed by connecting these through-holes 640a and 650a with each other. The through-holes 640a and 650a are so formed that the same are connected to through-holes 2a and 3a respectively. The through-hole 604a is an example of the "third through-hole" in the present invention.

A high coercive force region 604b is formed by combining the high coercive force regions 640b and 650b. The high coercive force regions 640b and 650b (high coercive force region 604b) are layeredly and circumferentially formed to surround the inner peripheral surfaces over the whole regions of the inner peripheral surfaces of the through-holes 640a and 650a (through-hole 604a). The high coercive force regions 640b and 650b are examples of the "second high coercive force regions" in the present invention. The remaining structure according to the third embodiment is similar to that of the first embodiment.

A manufacturing process for the Faraday rotator 600 according to the third embodiment of the present invention is now described with reference to FIG. 13.

First, two cylindrical magnet body pieces corresponding to the magnet pieces 640 and 650 are prepared. Then, the high coercive force regions 640b and 650b are formed over the whole regions of the inner peripheral surfaces of the through-holes 640a and 650a of the two magnet body pieces respectively. Thereafter the magnet pieces 640 and 650 shown in FIG. 13 are formed by magnetizing the two magnet body pieces in the direction (arrow X2 direction) parallel to the axial direction (X direction) and directed from a first magnet 202 (first magnet body) toward a second magnet 203 (second magnet body).

Thereafter the magnet pieces 640 and 650 are arranged to be along the axial direction (X direction), so that the through-holes 640a and 650a are connected with each other. Then, the magnet pieces 640 and 650 are bonded to each other with a two-part mixed adhesive. Thus, the third magnet 604 shown in FIG. 13 is formed. The remaining steps of the manufacturing process according to the third embodiment are similar to those of the first embodiment.

According to the third embodiment, as hereinabove described, the high coercive force regions 640b and 650b are layeredly and circumferentially formed over the whole regions of the inner peripheral surface of the through-hole 640a of the magnet piece 640 and the inner peripheral surface of the through-hole 650a of the magnet piece 650 respectively so that the high coercive force regions 640b and 650b having higher coercive force than the remaining portions can be provided over the whole regions of the inner peripheral surface of the through-hole 640a of the magnet piece 640 and the inner peripheral surface of the through-hole 650a of the magnet piece 650 easily causing irreversible demagnetization respectively, whereby irreversible demagnetization in the whole of the high coercive force region 604b and the third magnet 604 can be suppressed. Further, the high coercive force regions 640b and 650b have high coercive force, whereby irreversible demagnetization resulting from temperature rise can also be suppressed.

According to the third embodiment, as hereinabove described, the high coercive force region 604b consisting of the high coercive force regions 640b and 650b is formed by combining the magnet pieces 640 and 650 formed by parting the third magnet 604 on the X1 side and the X2 side through the Y-Z plane passing through the center of the third magnet 604 in the X direction in the axial direction while the high coercive force regions 640b and 650b (high coercive force region 604b) are layeredly and circumferentially formed to surround the inner peripheral surfaces over the whole regions of the inner peripheral surface of the through-hole 640a of the magnet piece 640 and the inner peripheral surface of the through-hole 650a (through-hole 604a) of the magnet piece 650 so that the inner peripheral surface of the through-hole 604a can be divided into the magnet pieces 640 and 650, whereby the high coercive force regions 640b and 650b can be reliably provided on the inner peripheral surfaces of the individual magnet pieces 640 and 650 as compared with a case of providing the high coercive force region 604b in a state where the thickness of the third magnet 604 in the axial direction (X direction) is large. Thus, the high coercive force region 604b of the third magnet 604 can be more reliably formed by combining the magnet pieces 640 and 650 provided with the high coercive force regions 640b and 650b. The remaining effects according to the third embodiment are similar to those of the first embodiment.

Fourth Embodiment

A fourth embodiment of the present invention is now described with reference to FIGS. 14 and 15. In relation to a Faraday rotator 700 according to this fourth embodiment, such a case that a third magnet 704 of a magnetic circuit 701 for a Faraday rotator is divided into four in an axial direction (X direction) along a central axis 1000 dissimilarly to the aforementioned embodiment is described.

Figure 14:
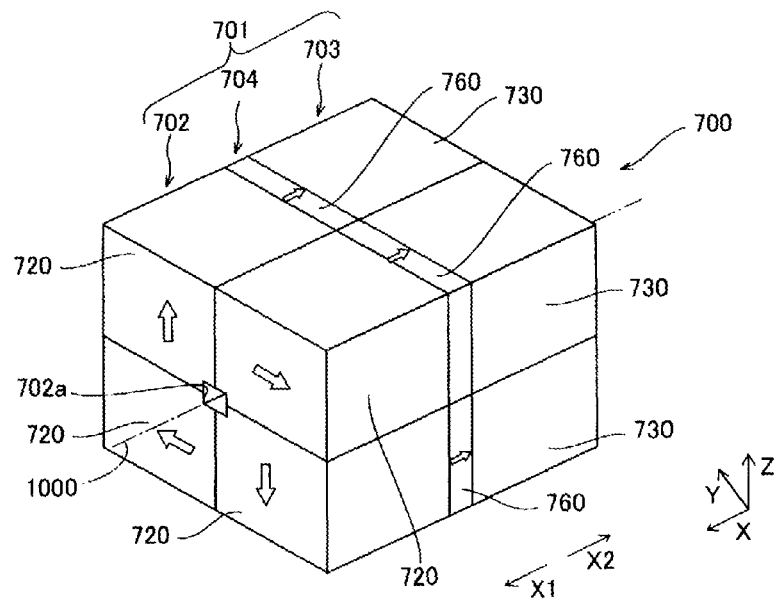
FIG. 14 A perspective view showing the structure of a Faraday rotator according to a fourth embodiment of the present invention.
Figure 15:
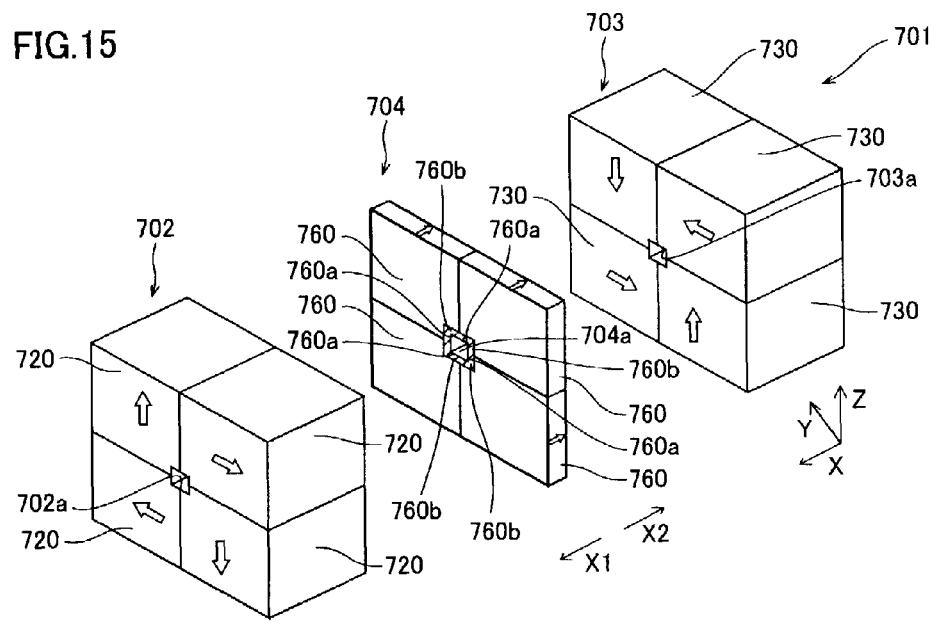
FIG. 15 An exploded perspective view showing the structure of a magnetic circuit for a Faraday rotator according to the fourth embodiment of the present invention.

The magnetic circuit 701 for a Faraday rotator in the Faraday rotator 700 according to the fourth embodiment of the present invention is formed by a first magnet 702, a second magnet 703 and the third magnet 704 having regular quadrangular prismatic shapes, as shown in FIGS. 14 and 15. Through-holes 702a, 703a and 704a (see FIG. 15) having square sectional shapes are formed at the centers of sections (Y-Z plane) of the first magnet 702, the second magnet 703 and the third magnet 704 respectively. The first magnet 702, the second magnet 703 and the third magnet 704 are formed to extend in a Z direction. The through-holes 702a, 703a and 704a are examples of the "first through-hole", the "second through-hole" and the "third through-hole" in the present invention respectively.

The first magnet 702, the second magnet 703 and the third magnet 704 are constituted by combining four magnet pieces 720, four magnet pieces 730 and four magnet pieces 760 formed by dividing the same from the central axis 1000 toward the sides of the outer peripheral surfaces of the first magnet 702, the second magnet 703 and the third magnet 704 respectively. The four magnet pieces 720, the four magnet pieces 730 and the four magnet pieces 760 have sections of such shapes that portions, corresponding to the through-holes 702a, 703a and 704a, in the corners of squares are squarely cut out in the Y-Z plane orthogonal to the axial direction (X direction). The through-holes 702a, 703a and 704a are formed by circumferentially combining the magnet pieces 720, 730 and 760 respectively.

The first magnet 702 is magnetized clockwise on the central axis 1000, serving as the rotation axis, as viewed from the X1 side by combining the four magnet pieces 720 magnetized in directions perpendicular to the axial direction (X direction). The second magnet 703 is magnetized anticlockwise on the central axis 1000, serving as the rotation axis, as viewed from the X1 side by combining the four magnet pieces 730 magnetized in the directions perpendicular to the axial direction (X direction).

High coercive force regions 760b are formed in the vicinity of the inner peripheral surfaces of the four magnet pieces 760 on the sides of the through-holes 704a respectively. A high coercive force region 704b of the third magnet 704 is formed by combining these four high coercive force regions 760b. The high coercive force region 704b is layeredly and circumferentially formed to surround the inner peripheral surface over the whole region of the inner peripheral surface of the through-hole 704a. The remaining structure according to the fourth embodiment is similar to that of the first embodiment.

A manufacturing process for the Faraday rotator 700 according to the fourth embodiment of the present invention is now described with reference to FIG. 15.

First, four magnet body pieces corresponding to the four magnet pieces 720, four magnet body pieces corresponding to the four magnet pieces 730 and four magnet body pieces corresponding to the four magnet pieces 760 are prepared. The 12 magnet body pieces are so formed that the directions of magnetization extend in white arrow directions in FIG. 15 in the state where the four magnet body pieces corresponding to the four magnet pieces 720, the four magnet body pieces corresponding to the four magnet pieces 730 and the four magnet body pieces corresponding to the four magnet pieces 760 are provided with the through-holes 702a, 703a and 704a respectively.

Then, the high coercive force regions 760b are formed in the vicinity of the inner peripheral surfaces of the four magnet body pieces corresponding to the four magnet pieces 760 on the sides of the through-holes 704a. Thereafter the four magnet pieces 720, the four magnet pieces 730 and the four magnet pieces 760 are formed by magnetizing the magnet body pieces in prescribed directions (directions of white arrows) respectively.

Then, the four magnet pieces 720, the four magnet pieces 730 and the four magnet pieces 760 are circumferentially arranged to form the through-holes 702a, 703a and 704a respectively. At this time, the four magnet pieces 720 are arranged to be magnetized clockwise on the central axis 1000, serving as the rotation axis, as viewed from the X1 side. The four magnet pieces 730 are arranged to be magnetized anticlockwise on the central axis 1000, serving as the rotation axis, as viewed from the X1 side. The four magnet pieces 760 are arranged to be magnetized in a direction parallel to the axial direction (X direction) and directed from the first magnet 702 toward the second magnet 703. Then, the four magnet pieces 720, the four magnet pieces 730 and the four magnet pieces 760 are bonded to each other with a two-part mixed adhesive. Thus, the first magnet 702, the second magnet 703 and the third magnet 704 are formed respectively. The remaining steps of the manufacturing process according to the fourth embodiment are similar to those of the first embodiment.

According to the fourth embodiment, as hereinabove described, the high coercive force region 704b is layeredly and circumferentially formed to surround the inner peripheral surface over the whole region of the inner peripheral surface of the through-hole 704a of the third magnet 704 so that the high coercive force region 704b having higher coercive force than the remaining portions can be provided over the whole region of the inner peripheral surface of the through-hole 704a of the third magnet 704 easily causing irreversible demagnetization, whereby irreversible demagnetization in the whole of the high coercive force region 704b and the third magnet 704 can be suppressed. Further, the high coercive force region 704b has high coercive force, whereby irreversible demagnetization resulting from temperature rise can also be suppressed.

When the high coercive force region 704b consisting of the four high coercive force regions 760b is layeredly and circumferentially formed to surround the inner peripheral surface over the whole region of the inner peripheral surface of the through-hole 704a by combining the four magnet pieces 760 formed by dividing the third magnet 704 along the axial direction (X direction) in the aforementioned fourth embodiment, as hereinabove described, the inner peripheral surface of the through-hole 704a can be divided into the four magnet pieces 760, whereby the high coercive force region 760b can be reliably provided on surfaces of the four magnet pieces 760 corresponding to the inner peripheral surface of the divided through-hole 704a as compared with a case of providing the high coercive force region 704b on the inner peripheral surface of the through-hole 704a in the state where the through-hole 704a is formed. Thus, the high coercive force region 704b of the third magnet 704 can be more reliably formed by combining the four magnet pieces 760 provided with the high coercive force regions 760b. The remaining effects according to the fourth embodiment are similar to those of the first embodiment.

Modification of Fourth Embodiment

A modification of the fourth embodiment of the present invention is now described with reference to FIG. 16. In relation to a Faraday rotator 800 according to this modification of the fourth embodiment, such a case that a first magnet 802, a second magnet 803 and a third magnet 804 of a magnetic circuit 801 for a Faraday rotator are formed by four magnet pieces 820, four magnet pieces 830 and four magnet pieces 870 in the form of rectangular parallelepipeds respectively dissimilarly to the aforementioned fourth embodiment is described.

Figure 16:
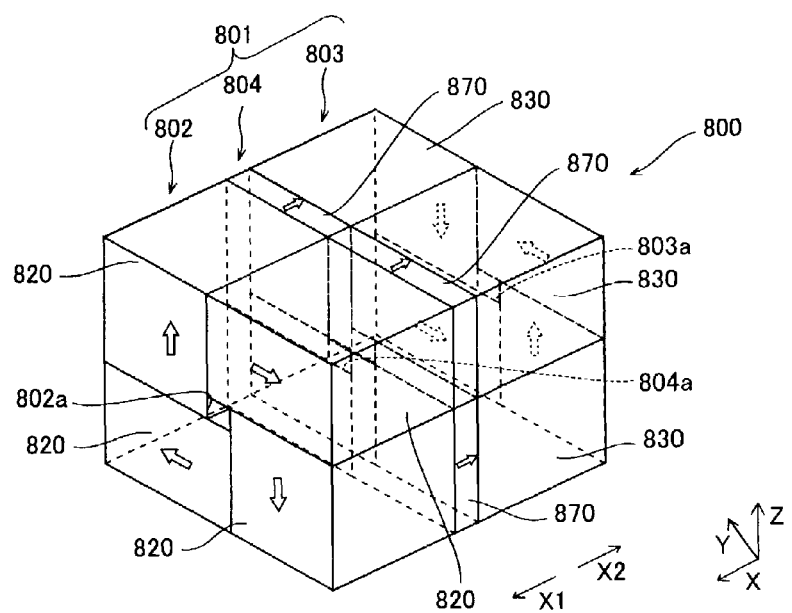
FIG. 16 A perspective view showing the structure of a Faraday rotator according to a modification of the fourth embodiment of the present invention.

In the magnetic circuit 801 for a Faraday rotator in the Faraday rotator 800 according to the modification of the fourth embodiment of the present invention, the first magnet 802, the second magnet 803 and the third magnet 804 are formed by combining the four magnet pieces 820, the four magnet pieces 830 and the four magnet pieces 870 in the form of rectangular parallelepipeds respectively, as shown in FIG. 16. Through-holes 802a, 803a and 804a having square sectional shapes are formed at the centers of sections (Y-Z plane) of the first magnet 802, the second magnet 803 and the third magnet 804 orthogonal to the axial direction (X direction) respectively. The through-holes 802a, 803a and 804a are formed by circumferentially combining the four magnet pieces 820, the four magnet pieces 830 and the four magnet pieces 870 in the form of rectangular parallelepipeds respectively. The through-holes 802a, 803a and 804a are examples of the "first through-hole", the "second through-hole" and the "third through-hole" in the present invention respectively.

The remaining structure, a manufacturing process and effects according to the modification of the fourth embodiment are similar to those of the fourth embodiment.

Fifth Embodiment

A fifth embodiment of the present invention is now described with reference to FIG. 17. In relation to a Faraday rotator 900 according to this fifth embodiment, such a case that a high coercive force region 904b is so provided on the inner peripheral surface of a third magnet 904 of a magnetic circuit 901 for a Faraday rotator that the distribution range enlarges from the sides of both end portions 4d and 4e toward the side of a central portion 4c dissimilarly to the aforementioned embodiment is described.

Figure 17:
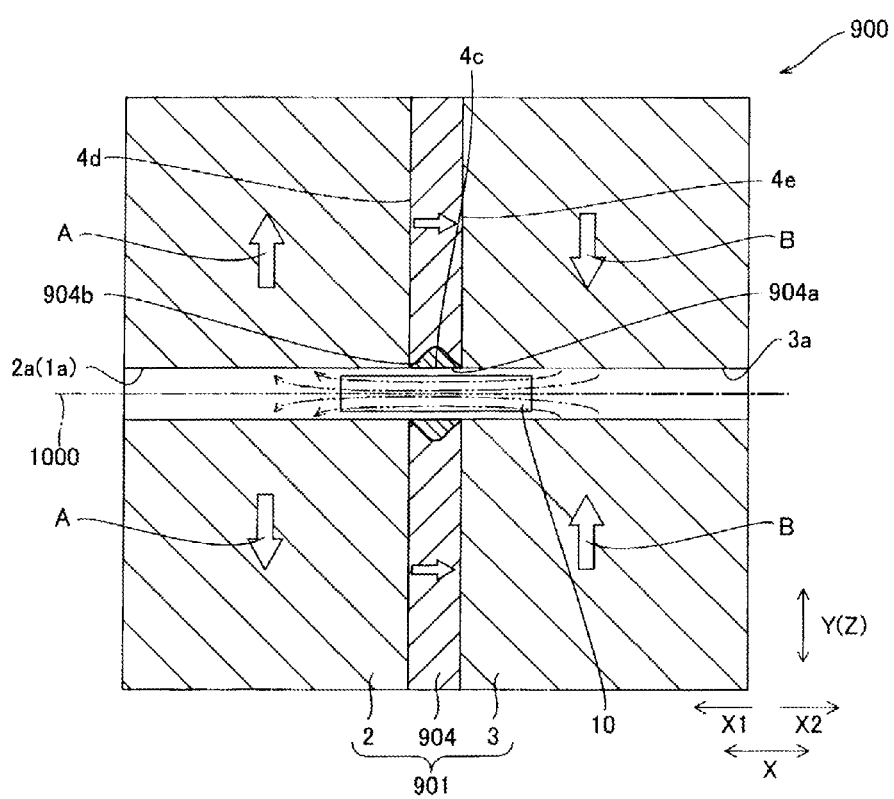
FIG. 17 A sectional view in a case of cutting a Faraday rotator according to a fifth embodiment of the present invention along a direction where a central axis extends.

In the magnetic circuit 901 for a Faraday rotator in the Faraday rotator 900 according to the fifth embodiment of the present invention, the high coercive force region 904b is formed on the inner peripheral surface of a through-hole 904a of the third magnet 904, as shown in FIG. 17. This high coercive force region 904b is so formed that the distribution range (depth) directed from the inner peripheral surface of the through-hole 904a toward the inner part (arrow A direction) of the third magnet 904 gradually enlarges from both end portions 4d and 4b of the third magnet 904 on an X1 side and an X2 side toward the side of the central portion 4c. The remaining structure according to the fifth embodiment is similar to that of the first embodiment.

A manufacturing process according to the fifth embodiment is similar to that of the first embodiment, except that the high coercive force region 904b is so formed on the inner peripheral surface of the through-hole 904a that the distribution range directed from the inner peripheral surface of the through-hole 904a toward the inner part (arrow A direction) of the third magnet 904 gradually enlarges from both end portions 4d and 4e of the third magnet 904 on the X1 side and the X2 side toward the side of the central portion 4c.

According to the fifth embodiment, as hereinabove described, the high coercive force region 904b is so formed on the inner peripheral surface of the through-hole 904a that the distribution range directed from the inner peripheral surface of the through-hole 904a toward the inner part (arrow A direction) of the third magnet 904 gradually enlarges from both end portions 4d and 4e of the third magnet 904 on the X1 side and the X2 side toward the side of the central portion 4c so that the high coercive force region 904b having higher coercive force than the remaining portions can be provided on the inner peripheral surface of the through-hole 904a of the third magnet 904 easily causing irreversible demagnetization, whereby irreversible demagnetization in the whole of the high coercive force region 904b and the third magnet 904 can be suppressed. Further, the high coercive force region 904b has high coercive force, whereby irreversible demagnetization resulting from temperature rise can also be suppressed. In addition, the high coercive force region 904b can be distributed in a wider range on the central portion 4c more easily causing irreversible demagnetization resulting from a reverse magnetic field, whereby irreversible demagnetization in the central portion 4c of the third magnet 904 can be effectively suppressed by smaller concentration of a heavy rare earth element The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are included.

For example, while the example of providing the high coercive force region only on the side of the inner peripheral surface of the third magnet has been shown in each of the aforementioned first to fifth embodiments, the present invention is not restricted to this. According to the present invention, the high coercive force region may be provided over the whole region of the third magnet by diffusing the heavy rare earth element into the third magnet from the whole region of the surface of the third magnet. Thus, irreversible demagnetization in the whole of the third magnet can be further suppressed.

While the example of providing the high coercive force region only on the third magnet has been shown in each of the aforementioned first to fifth embodiments, the present invention is not restricted to this. According to the present invention, high coercive force regions may be provided not only on the third magnet, but also on the first magnet and the second magnet. In this case, the high coercive force regions are preferably provided on central portions in the axial direction on the inner side surfaces and the outer peripheral surfaces of the through-holes in the first magnet and the second magnet, from the results of the simulation related to the distributed state of the permeance coefficient shown in FIG. 8.

While the example of forming the high coercive force region by diffusing the heavy rare earth element RH into the inner part of the third magnet or the magnet body pieces from the side of the through-hole of the third magnet or the magnet body pieces has been shown in each of the aforementioned first to fifth embodiments, the present invention is not restricted to this. According to the present invention, a third magnet or each magnet piece is constituted of an inner diameter-side magnet piece and an outer diameter-side magnet piece, and a high coercive force region is formed on the inner diameter-side magnet piece by performing RH diffusion on the inner side surface of a through-hole of the inner diameter-side magnet piece or the whole of the inner diameter-side magnet piece. Thereafter the third magnet or the magnet piece may be formed by bonding the inner diameter-side magnet piece and the outer diameter-side magnet piece to each other. At this time, the high coercive force region is preferably formed up to a depth of at least 3 mm from the inner peripheral surface of the through-hole toward the inner part of the third magnet or the magnet piece.

While the example of employing the R—Fe—B-based sintered magnet having the coercive force of about 2350 kA/m as the third magnet has been shown in each of the aforementioned first to fifth embodiments, the present invention is not restricted to this. According to the present invention, an R—Fe—B-based sintered magnet having coercive force larger than about 2350 kA/m may be employed or a magnet other than the R—Fe—B-based sintered magnet may be employed as the third magnet.

While such an example that the third magnet 904 is formed by an integral magnet has been shown in the aforementioned fifth embodiment, the present invention is not restricted to this. According to the present invention, the third magnet 904 may be divided into two on the Y-Z plane, similarly to the third magnet 604 in the third embodiment. In a case of diffusing the heavy rare earth element RH in a state where the through-hole 640a of the magnet body 640 and the through-hole 650a of 650 are arranged opposedly to a bulk body which is an RH diffusion source by the method described in WO2007/102391 at this time, the heavy rare earth element RH is diffused not only into the inner peripheral surfaces of the through-holes 604a and 650a, but also into the surfaces opposed to the bulk body. Then, the surface of the magnet piece 640 into which the heavy rare earth element RH is diffused and the surface of the magnet piece 650 into which the heavy rare earth element RH is diffused are bonded to each other with a two-part mixed adhesive, to be opposed to each other. Thus, the surfaces, into which the heavy rare earth element RH is substantially entirely diffused, having been opposed to the bulk body can be arranged on the central portion 4c of the third magnet 904. Consequently, the high coercive force region 904b can be easily so formed that the distribution range directed from the inner peripheral surface of the through-hole 4a toward the inner part (arrow A direction) of the third magnet 904 gradually enlarges from both end portions 4d and 4e of the third magnet 904 on the X1 side and the X2 side toward the side of the central portion 4c.

INDUSTRIAL APPLICABILITY

The present invention is suitable for a Faraday rotator for a high-output laser employing TGG as a Faraday element.

The invention claimed is:

1. A magnetic circuitfor a Faraday rotator, in which a Faraday element of a Faraday rotator is arranged, comprising:
a first magnet, including a first through-hole extending in an axial direction, magnetized in a direction perpendicular to said axial direction and directing away from said first through-hole;
a second magnet, including a second through-hole extending in said axial direction, magnetized in a direction perpendicular to said axial direction and directed toward said second through-hole; and
a third magnet arranged between said first magnet and said second magnet in said axial direction and magnetized in a direction parallel to said axial direction and directed from said first magnet toward said second magnet, wherein
said third magnet includes a third through-hole, extending in said axial direction to connect said first through-hole and said second through-hole with each other, in which said Faraday element is arranged, and
a first high coercive force region is provided in the vicinity of at least an inner peripheral surface of said third through-hole of said third magnet.

2. The magnetic circuit for a Faraday rotator according to claim 1, wherein
said first high coercive force region provided on said third magnet is provided on at least a central portion of said third magnet along said axial direction in the inner peripheral surface of said third through-hole of said third magnet.

3. The magnetic circuit for a Faraday rotator according to claim 2, wherein
said first high coercive force region is provided over the whole region of the inner peripheral surface of said third through-hole in said axial direction.

4. The magnetic circuit for a Faraday rotator according to claim 2, wherein said first high coercive force region is so formed that a distribution range from said inner peripheral surface in a direction directing away from said third through-hole enlarges from the sides of both end portions of said third magnet along said axial direction toward the side of said central portion.

5. The magnetic circuit for a Faraday rotator according to claim 1, wherein
said first high coercive region is provided on a portion of said third magnet located in the vicinity of, in a magnetic field constituted of said first magnet and said second magnet, said magnetic field in said axial direction substantially orthogonal to the direction of magnetization of said first magnet and the direction of magnetization of said second magnet and a direction directed from said second magnet toward said first magnet.

6. The magnetic circuit for a Faraday rotator according to claim 1, wherein
said third magnet is formed of an R-T-B-based magnet mainly containing a rare earth element R, a transition element mainly composed of Fe, and B (boron),
said first high coercive force region is formed of a heavy rare earth element concentrating in the vicinity of the inner peripheral surface of said third through-hole of said third magnet, and
said rare earth element R is mainly composed of Nd and Pr, and at least 50% of said rare earth element R contains Nd.

7. The magnetic circuit for a Faraday rotator according to claim 6, wherein
said first high coercive force region is mainly composed of a main phase of a tetragonal $R_2Fe_{14}B$-type compound, and formed of said heavy rare earth element, comprising at least either one of Dy and Tb, being diffused into an outer periphery of said main phase and concentrating thereon.

8. The magnetic circuit for a Faraday rotator according to claim 1, wherein
said first high coercive force region is circumferentially provided to surround said third through-hole in which said Faraday element is arranged.

9. The magnetic circuit for a Faraday rotator according to claim 1, wherein
said first high coercive force region is formed in the range of at least 3 mm from the inner peripheral surface of said third through-hole in a direction orthogonal to said axial direction and directing away from said third through-hole.

10. The magnetic circuit for a Faraday rotator according to claim 1, wherein
the coercive force of a portion of said third magnet other than said first high coercive force region is not less than the coercive force of said first magnet and said second magnet.

11. The magnetic circuit for a Faraday rotator according to claim 1, wherein
the coercive force of a portion of said third magnet other than said first high coercive force region is at least 2350 kA/m, and smaller than the coercive force of said first high coercive force region.

12. The magnetic circuit for a Faraday rotator according to claim 1, wherein
a plurality of first magnet pieces formed of parting said third magnet on a plane orthogonal to said axial direction and each provided with a second high coercive force region are combined in the axial direction so that said first high coercive region consisting of a plurality of said second high coercive force regions is created, and
said first high coercive force region consisting of said plurality of second high coercive force regions is provided in the vicinity of at least said inner peripheral surface of said third through-hole.

13. The magnetic circuit for a Faraday rotator according to claim 1, wherein
said first magnet and said second magnet are arranged to alternately line up along said axial direction while holding said third magnet therebetween.

14. The magnetic circuit for a Faraday rotator according to claim 1, wherein
the distances from first ends to second ends of said first magnet, said second magnet and said third magnet in a direction orthogonal to said axial direction correspond to a first distance,
the distances from first ends to second ends of said first through-hole, said second through-hole and said third through-hole in the direction orthogonal to said axial direction correspond to a second distance, and
said first distance is at least eight times and not more than twenty times said second distance.

15. A method of manufacturing a magnetic circuit for a Faraday rotator comprising a first magnet, including a first through-hole extending in an axial direction, magnetized in a direction perpendicular to said axial direction and directing away from said first through-hole, a second magnet, including a second through-hole extending in said axial direction, magnetized in a direction perpendicular to said axial direction and directed toward said second through-hole and a third magnet, including a third through-hole, extending in said axial direction to connect said first magnet and said second magnet with each other, in which said Faraday element is arranged, magnetized in a direction parallel to said axial direction and directed from said first magnet toward said second magnet, comprising:
providing a first high coercive force region in the vicinity of at least an inner peripheral surface of said third through-hole by diffusing a heavy rare earth element from the inner peripheral surface of said third through-hole of said third magnet formed of an R-T-B-based magnet mainly containing a rare earth element R, a transition element mainly composed of Fe, and B (boron); and
connecting said first magnet, said second magnet and said third magnet with each other so that said first through-hole, said second through-hole and said third through-hole are connected with each other in said axial direction and said third magnet is arranged between said first magnet and said second magnet in said axial direction, wherein
said rare earth element R is mainly composed of Nd and Pr, and at least 50% of said rare earth element R contains Nd.

16. The method of manufacturing a magnetic circuit for a Faraday rotator according to claim 15, wherein
the step of providing said first high coercive force region includes a step of providing said first high coercive force on at least said central portion in the inner peripheral surface of said third through-hole by diffusing said heavy rare earth element from the inner peripheral surface of said third through-hole of said third magnet.

17. The method of manufacturing a magnetic circuit for a Faraday rotator according to claim 16, wherein
the step of providing said first high coercive force region on said central portion includes a step of providing said first high coercive force region over the whole region of the inner peripheral surface of said third through-hole in said axial direction by diffusing the heavy rare earth element substantially from the overall surface of the inner peripheral surface of said third through-hole.

18. The method of manufacturing a magnetic circuit for a Faraday rotator according to claim 16, wherein
the step of providing said first high coercive force region on said central portion includes a step of providing said first high coercive force region so that a distribution range from said inner peripheral surface in a direction directing away from said third through-hole enlarges from the sides of both end portions of said third magnet along said axial direction toward the side of said central portion.

19. The method of manufacturing a magnetic circuit for a Faraday rotator according to claim 15, wherein
the step of providing said first high coercive force region includes a step of circumferentially providing said first high coercive force region to surround said third through-hole in which said Faraday element is arranged.

* * * * *